(12) United States Patent
Dottax et al.

(10) Patent No.: US 12,093,947 B2
(45) Date of Patent: Sep. 17, 2024

(54) MEMORY MANAGEMENT IN A TRANSACTION PROCESSING DEVICE

(71) Applicant: IDEMIA FRANCE, Courbevoie (FR)

(72) Inventors: Emmanuelle Dottax, Courbevoie (FR); Lauren Del Giudice, Courbevoie (FR)

(73) Assignee: IDEMIA FRANCE, Courbevoie (FR)

( * ) Notice: Subject to any disclaimer, the term of this patent is extended or adjusted under 35 U.S.C. 154(b) by 199 days.

(21) Appl. No.: 17/721,380

(22) Filed: Apr. 15, 2022

(65) Prior Publication Data
US 2022/0335420 A1 Oct. 20, 2022

(30) Foreign Application Priority Data

Apr. 16, 2021 (FR) ...................................... 21 03946

(51) Int. Cl.
*G06Q 20/40* (2012.01)
*G06Q 20/38* (2012.01)

(52) U.S. Cl.
CPC ......... *G06Q 20/389* (2013.01); *G06Q 20/401* (2013.01)

(58) Field of Classification Search
CPC ............... G06Q 20/389; G06Q 20/401; G06Q 20/0655; G06Q 20/3223; G06Q 20/38215; G06Q 20/42; H04L 9/50; H04L 9/3247; H04L 9/3239
See application file for complete search history.

(56) References Cited

U.S. PATENT DOCUMENTS

| 2003/0159010 A1* | 8/2003 | Bryborn | B29C 45/14311 |
| | | | 711/159 |
| 2017/0046689 A1* | 2/2017 | Lohe | G06Q 20/384 |
| 2020/0104474 A1* | 4/2020 | Duane | G06Q 20/352 |

FOREIGN PATENT DOCUMENTS

| CN | 101320389 A | * 12/2008 |
| EP | 3796198 A1 | 3/2021 |

OTHER PUBLICATIONS

"EMV Contactless Specifications for Payment Systems", Version 2.6, Feb. 2016.*
Dennis Richard et al "A temporal Blockchain: A Formal Analysis" 2016 International Conference on Collaboration Technologies and Systems (CTS), IEEE Oct. 31, 2016 (Jan. 31, 2016), pp. 430-437, XP033073727, DOI:10.1109/CTS.2016.0082.

* cited by examiner

*Primary Examiner* — Duan Zhang
(74) *Attorney, Agent, or Firm* — WOMBLE BOND DICKINSON (US) LLP

(57) ABSTRACT

The disclosure proposes a method in a first device comprising a transaction history and a generation counter, this device processing transactions with a second device. During a current transaction: receipt of data comprising a public key of the second device, a second generation counter and an identifier of the current transaction; verification that the first and second generation counters coincide; verification that the history comprises an input associated with the public key; approval of the current transaction if the transaction identifier satisfies a condition indicating the uniqueness of the current transaction; storage in the history of a new input with the public key; and update of an account balance to pay a credit to an account. The method also comprises: detection of a risk of saturation of the memory of the first device; update of the first generation counter and eviction of the memory.

16 Claims, 8 Drawing Sheets

[Fig. 1]
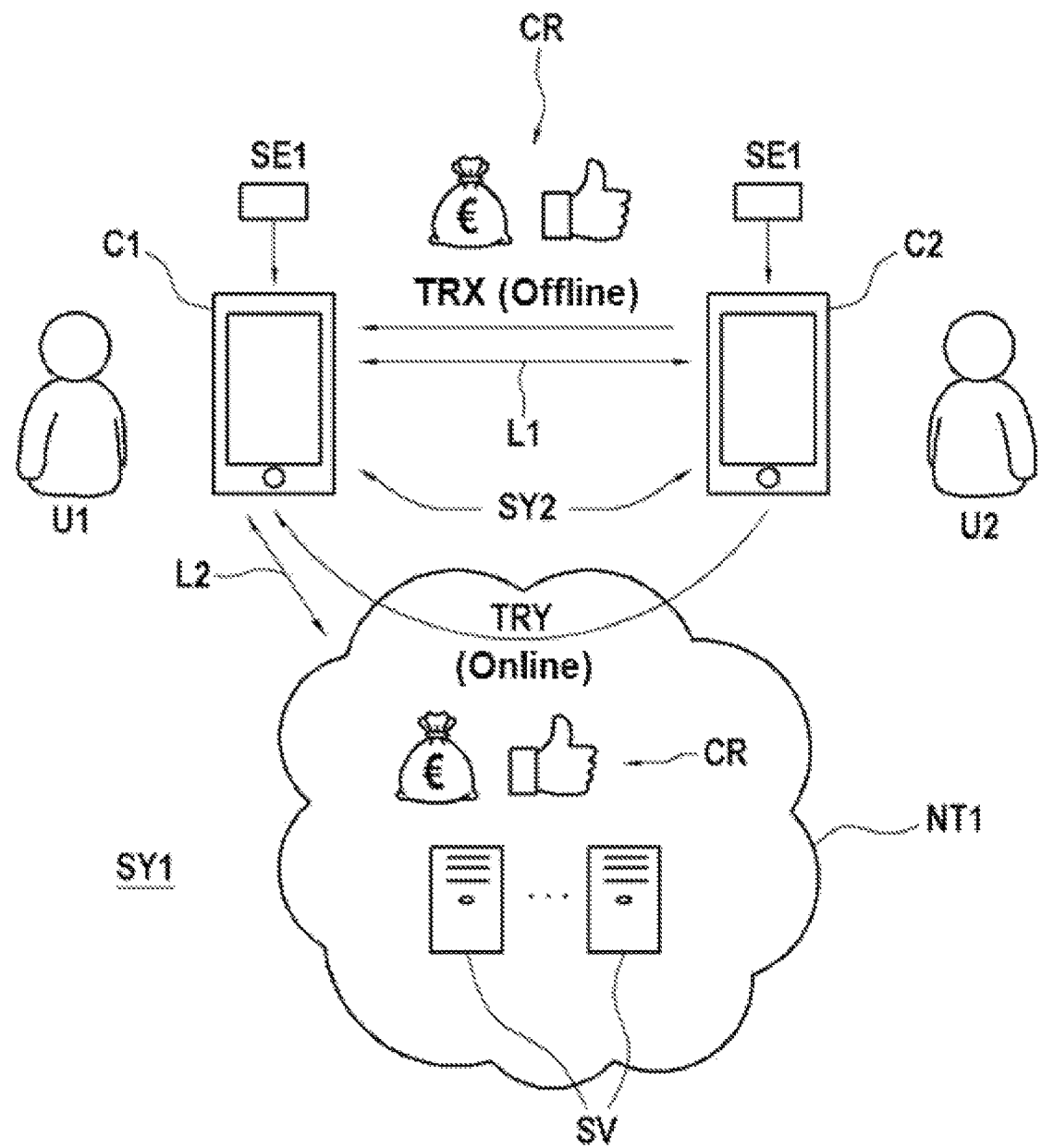

[Fig. 2]
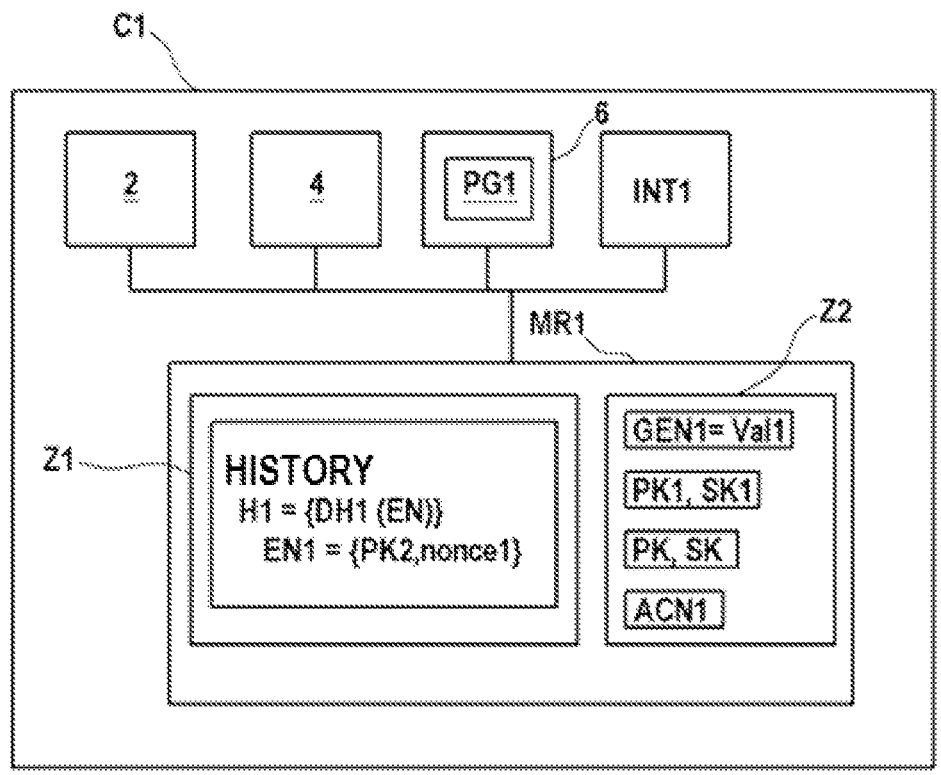
[Fig. 3]
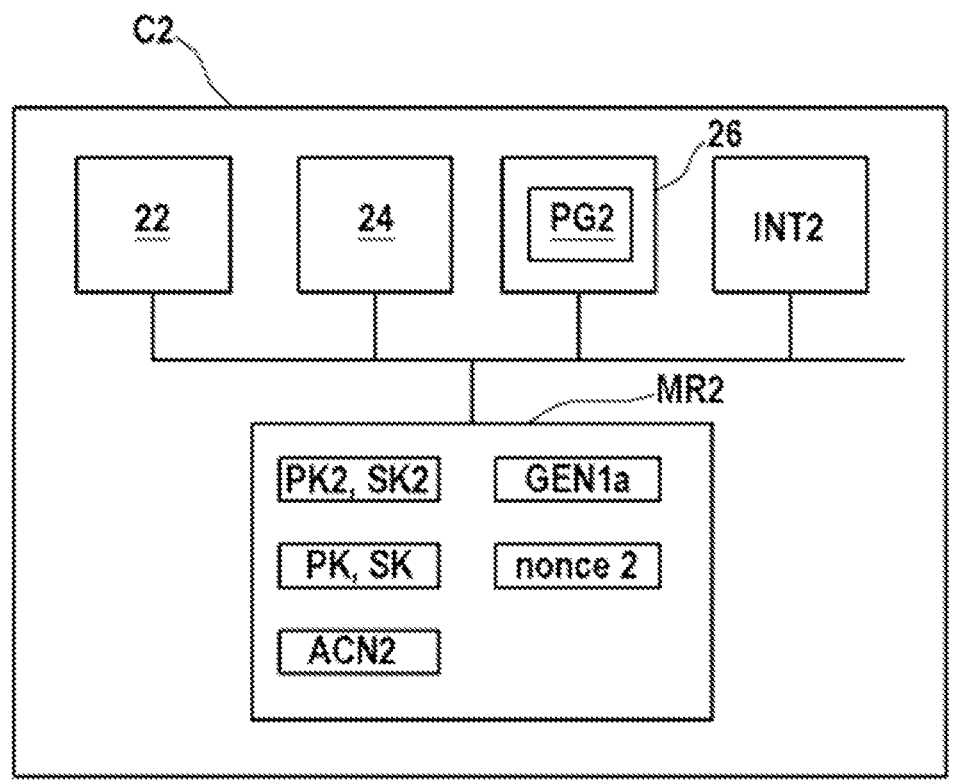

[Fig. 4]
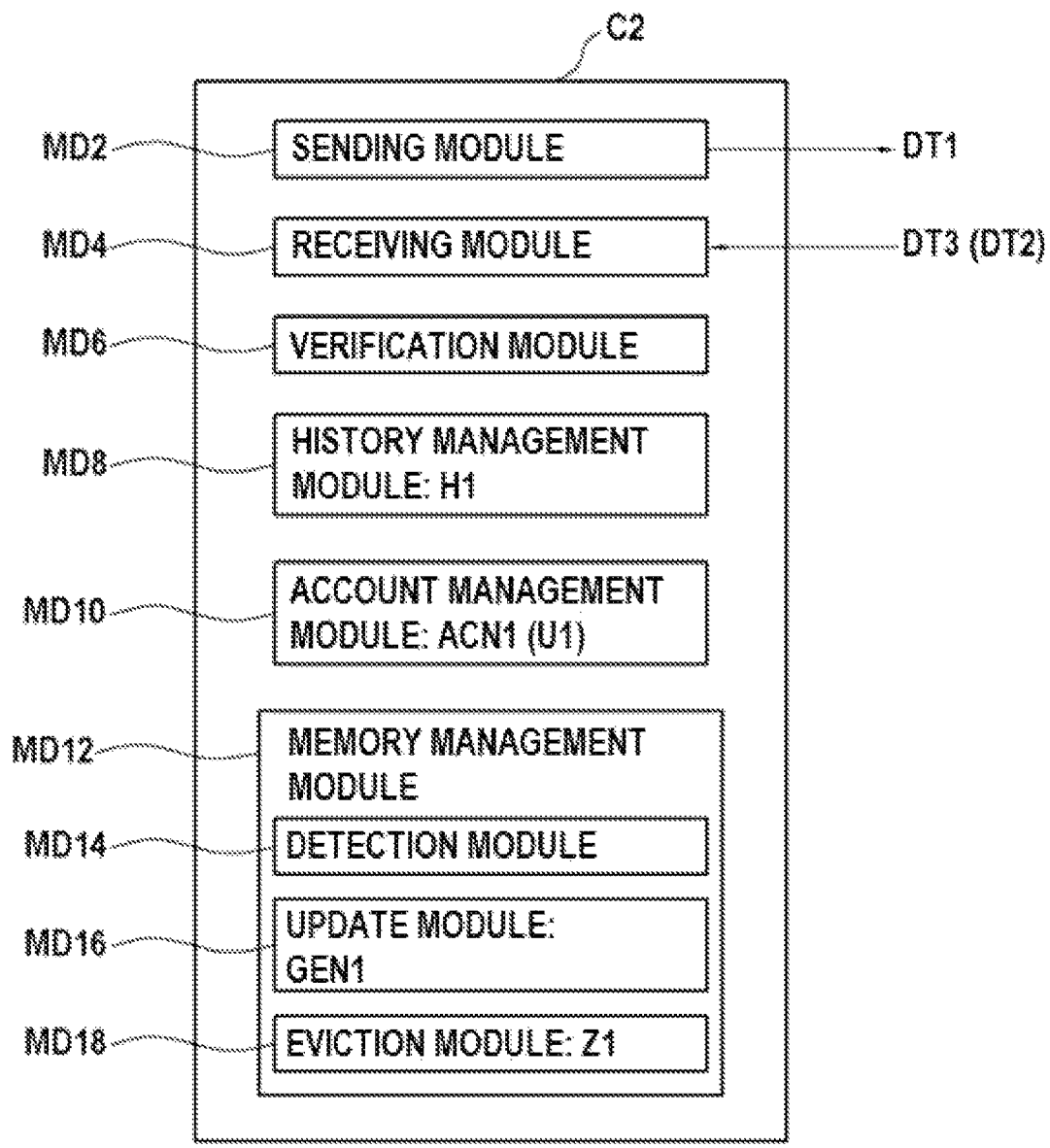

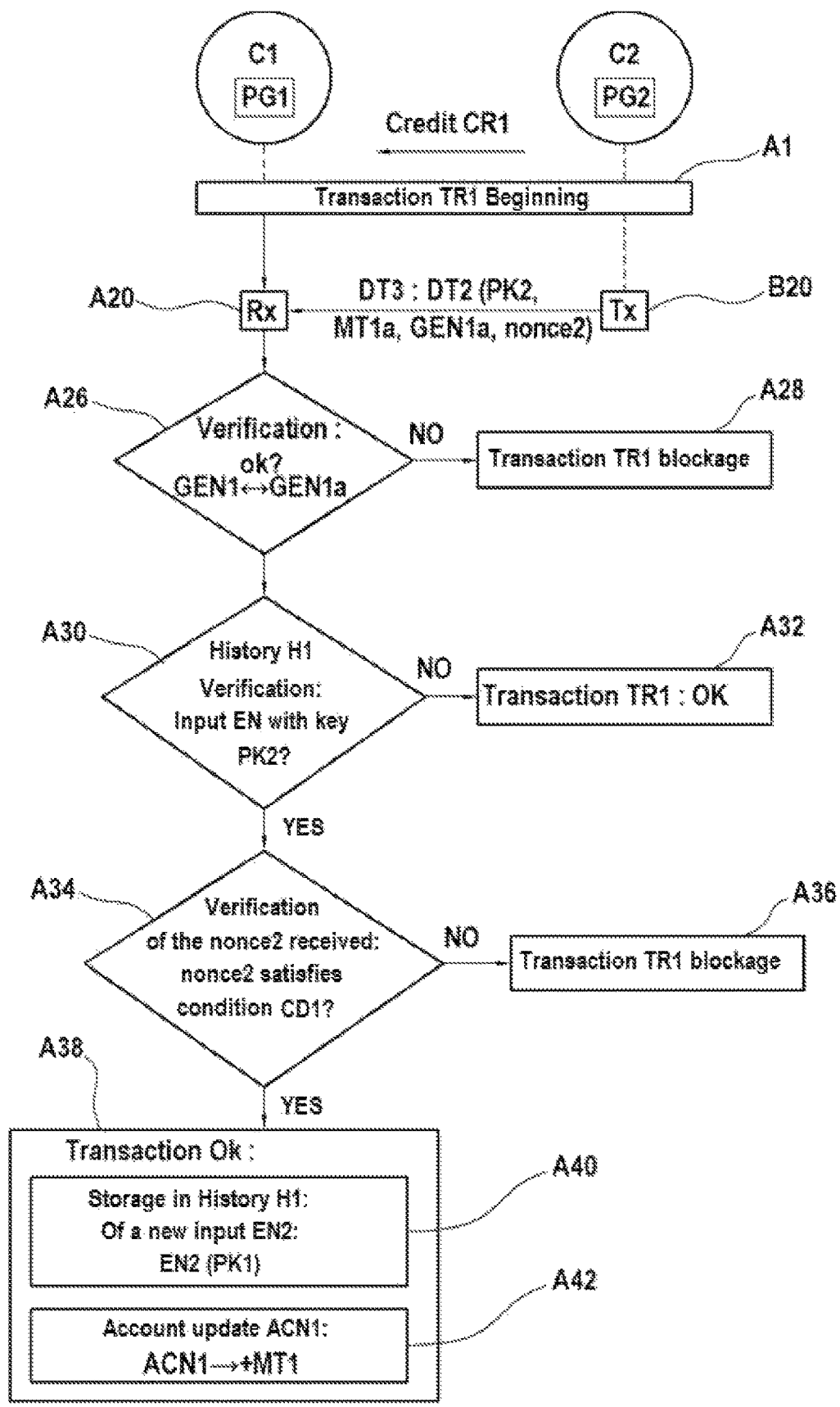
[Fig. 5]

[Fig. 6]
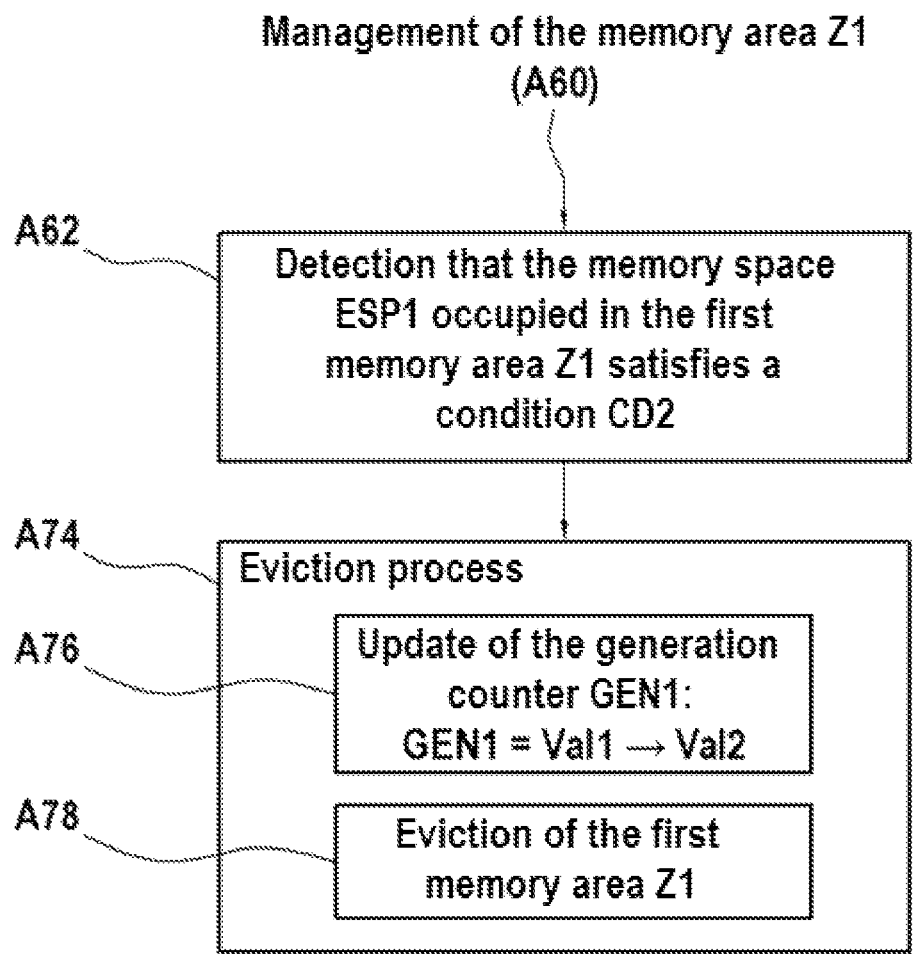

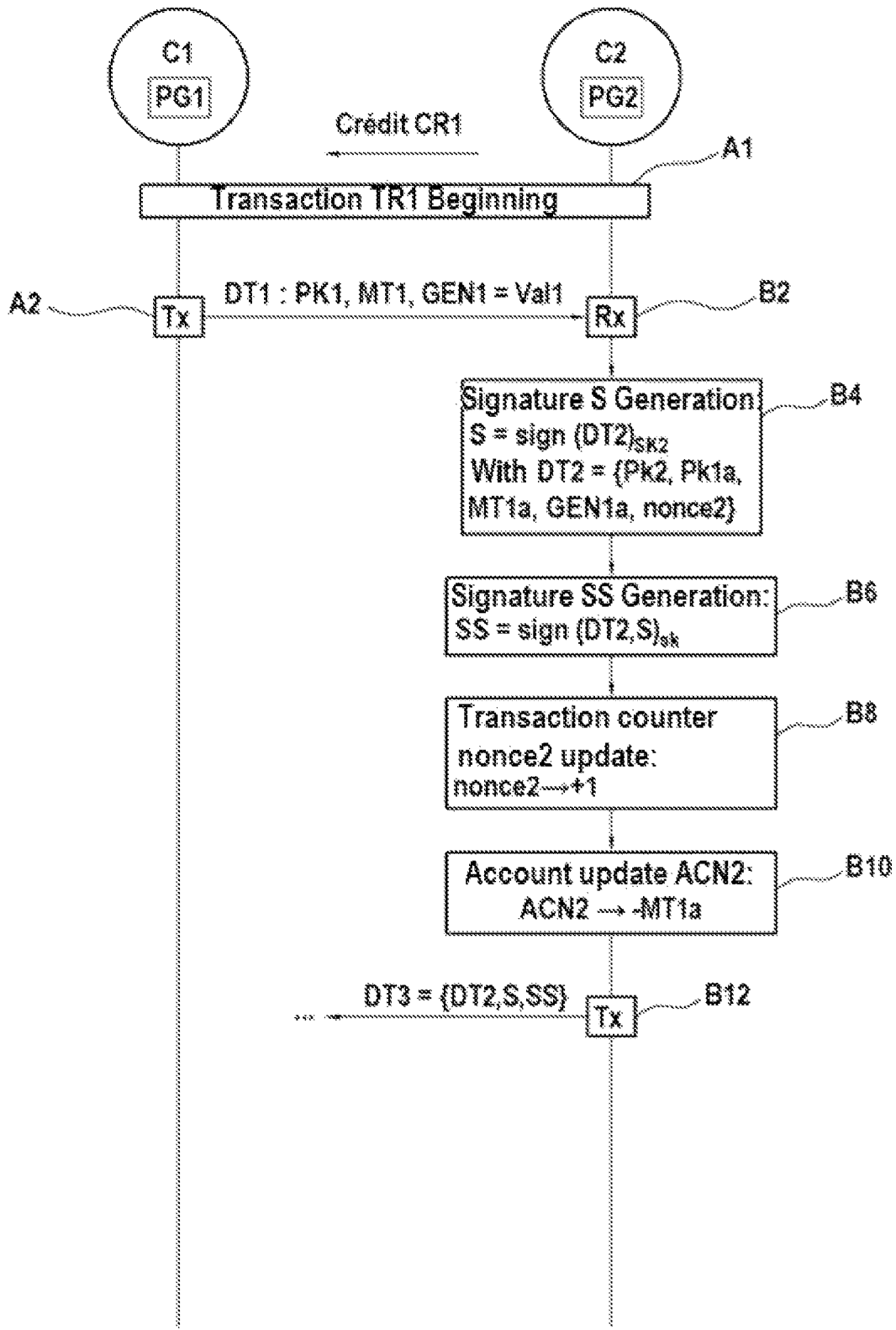

[Fig. 8]
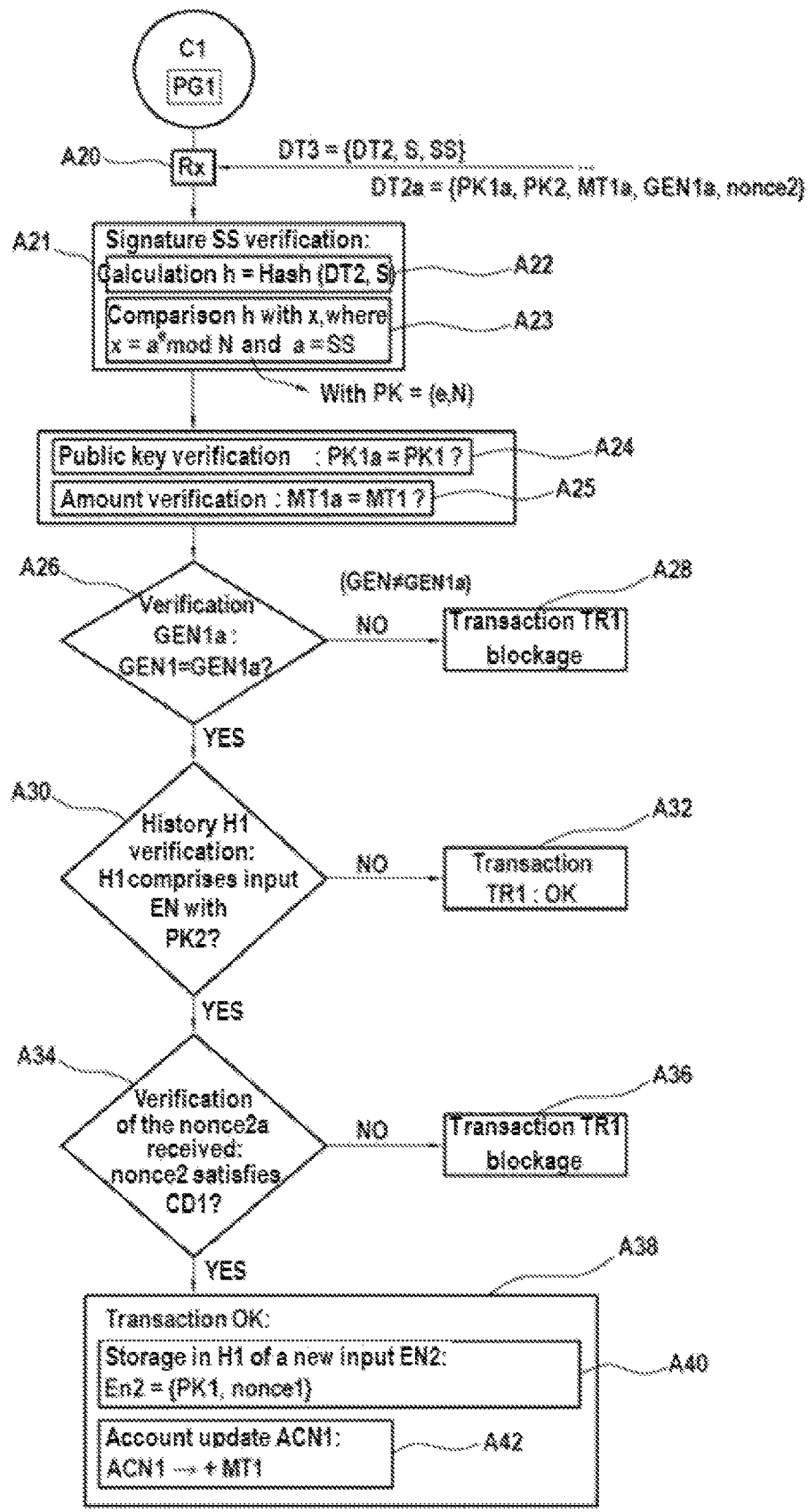

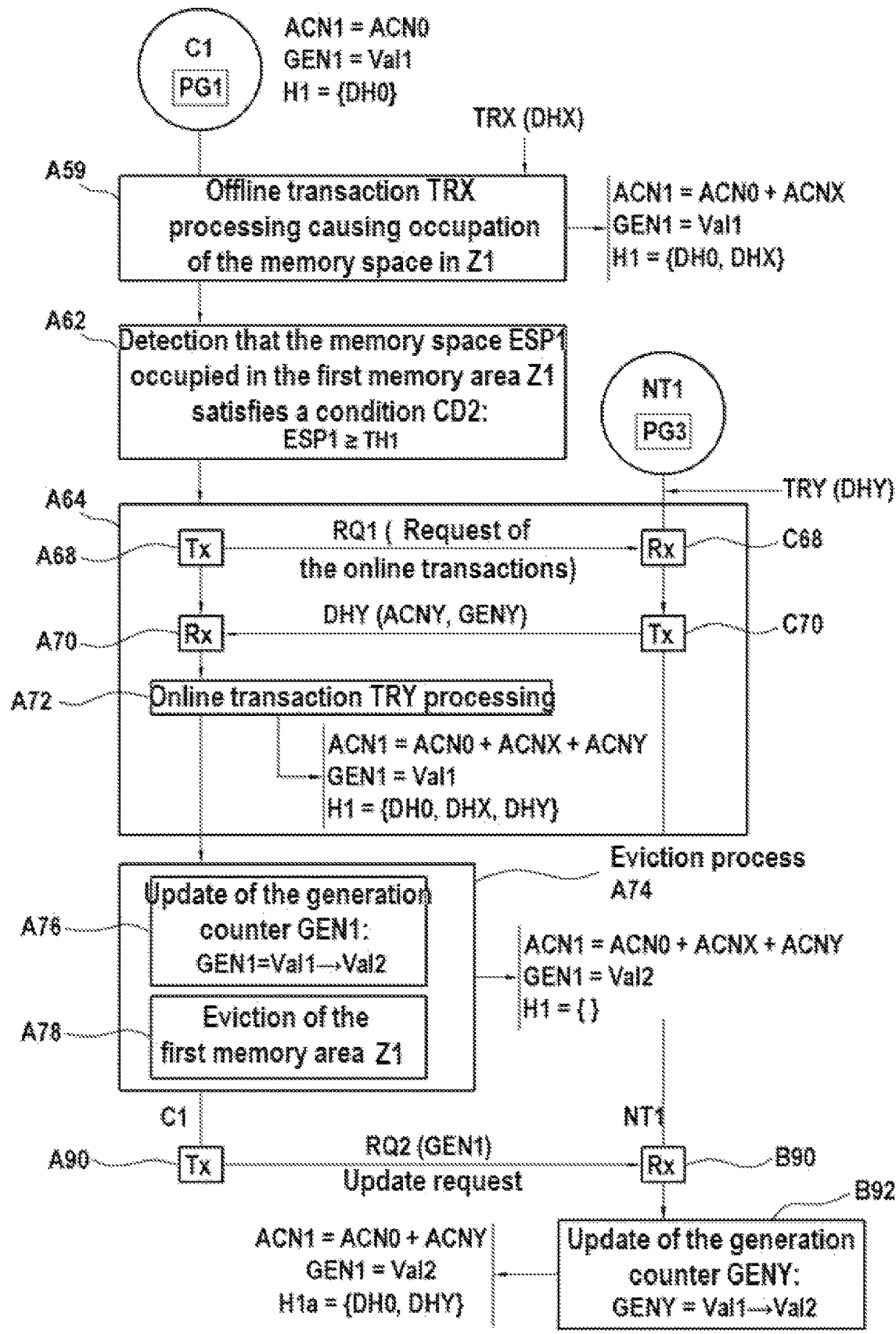
[Fig. 9]

MEMORY MANAGEMENT IN A TRANSACTION PROCESSING DEVICE

FIELD OF THE DISCLOSURE

The disclosure relates to the field of devices able to process electronic transactions, such as payment transactions or reputation transactions for example, as well as to methods for implementing such transactions. The disclosure particularly relates to the processing of transactions using cryptographic mechanisms to secure said transactions.

The disclosure applies in particular, but not exclusively, to payment devices for making peer-to-peer payments in a cryptographic currency (or cryptocurrency), that is to say a virtual currency usable on a public or private decentralized computer network. Other applications intended to electronically transfer credits of various kinds are also envisaged.

BACKGROUND

It is known to use payment devices implementing a virtual wallet to receive or make a payment in any cryptographic currency. A cryptographic-type virtual currency well known today is Ether, which is based on a payment system called Ethereum. The Ethereum system allows making account-to-account transactions, through software called wallet implemented in appropriate processing devices (smartphones, computers, etc.). The validity of each transaction is verified by verification terminals (or software) called "validators". Once the transactions are validated, they are submitted by the "miners" to a public register called blockchain because of its structure consisting of a series of blocks. Each block defines transactions validated by the validators and refers to previous transactions.

A virtual wallet allows particularly creating an account and making transactions in Ether with a third-party account. During a payment transaction, for example, the virtual wallet account is debited with a certain amount in Ether to credit the third-party account.

In known manner, a transaction device can be used to make a transaction in online mode (that is to say by cooperating with a remote server belonging to an online system of a third-party operator) or in offline mode (i.e. without cooperating with a remote server but by cooperating directly with a peer device, in Peer To Peer mode).

To process electronic transactions, such as payment transactions for example, a device can be configured to record in its internal memory transaction data representative of previously approved transactions. A device can in particular store a transaction history to allow a monitoring of the transactions approved by this device, particularly to identify payments received from another device. Such a history can in particular be used to secure the processing of transactions.

However, the memory space required to store these history data in a processing device increases as new transactions are approved (or received) by this device. The memory resources and the resources necessary to generate such memory are generally relatively limited, due to the very nature of the devices used to process transactions. Particularly, although other types of equipment are possible, mobile devices such as smart cards or mobile terminals (smartphones, tablets), which inherently have relatively limited memories and processing resources, are often used.

There is therefore a need for a solution that allows efficient management of the memory in a transaction processing device, without this compromising the security of the transactions made. This need to optimize the use of memory space in such processing devices applies for the processing of any electronic transactions such as payment transactions, reputation transactions aimed at transferring reputation credits (taking example the form of "Like"), or to all other types of transactions that allow transferring a credit of a certain amount and of a certain nature from a device called "debit" (or payer) device to another device called "credit" (or receiver) device.

The management of the memory must be done while guaranteeing the security of the transactions, including those made in offline mode by the processing devices in question. Particularly, it is important to avoid double payments, and more generally to guarantee that the same credit device cannot approve the same credits from a debit device several times.

SUMMARY

To this end, the present disclosure relates to a control method (also called "method") implemented by a first device able to process transactions in cooperation with a second device, the first device comprising:
- a first memory area in which a history (H1) comprising one or several inputs representative of a transaction is stored, and
- a second memory area in which a first generation counter set to an initial value is stored,
- the method comprising, during a processing of a current transaction:
  a) consultation of the second memory area to determine the first generation counter at a current time during which the current transaction is processed.
  b) receipt, coming from the second device, of first data comprising second data, said second data comprising:
  a public key of the second device,
  an amount of a credit to be paid during the current transaction,
  a second generation counter, and
  a first transaction identifier allocated by the second device to the current transaction;
  c) verification that the first and second generation counters have values that are equal;
  d) if the result of the verification c) is negative, denial of the current transaction by said first device;
  e) if the result of the verification c) is positive, verification in the first memory area that the history comprises an input associated with the public key of the second device;
  f) if the result of the verification e) is negative, the current transaction is approved;
  g) if the result of the verification e) is positive, verification that the first transaction identifier satisfies a first predetermined condition indicating the uniqueness of the current transaction;
  h) if the result of the verification g) is positive, the current transaction is approved;
  in which, if the current transaction is approved, the processing of the current transaction further comprises:
  i) storage in the history of a new input associated with the public key of the second device; and
  j) update of an account balance stored in the second memory area, so as to pay the amount of said credit to the account associated with the first device;
  the method further comprising a step of managing the first memory area, said management step being implemented before, during or after a current transaction and, comprising:

k) detection that the space occupied in the first memory area satisfies a second predetermined condition indicating a risk of saturation of said first memory area; and l) in response to the detection k), implementation of an eviction process comprising:

l1) update of the first generation counter in the second memory area so as to assign to said first generation counter a new value different from the initial value; and l2) eviction of at least part of the first memory area in order to free memory space, when said management step is implemented during the current transaction, it is implemented with the exception of the following times:

Between and during the step of consulting the second memory area to determine the first generation counter at a current time during which the current transaction is processed and step A30, if the test of step A26 is positive.

Between and during the step of consulting the second memory area to determine the first generation counter at a current time during which the current transaction is processed and step A26, if the test of step A26 is negative.

Between and during the step of consulting the second memory area to determine the first generation counter at a current time during which the current transaction is processed and step A40.

The disclosure allows efficiently managing the memory of the first device, without compromising the security of the transactions made. Indeed, the transaction history increases in size as new credits are received by the first device. The management step allows freeing memory space in the first memory area if necessary, that is to say when a risk of saturation of this memory area is detected, so that there is always enough memory space to record a recent history of transactions. To do so, an eviction process is performed to delete all or part of the first memory area upon detection that this memory may soon be saturated. By deleting particularly all or part of the history comprised in the first memory area, it is possible to avoid reaching the saturation of said first memory area, which would cause difficulties in the operation of the first device. This memory eviction (or purging) mechanism is all the more useful since the memory resources can be relatively limited in some types of devices, such as mobile terminals, smart cards, etc.

Furthermore, the management of the first memory area is carried out while guaranteeing the security of the transactions, including those made in offline mode by the first device with external devices such as the second device. Particularly, the disclosure allows avoiding double payments, and more generally guaranteeing that the same credit device cannot approve the same credits from a debit device several times. Indeed, the purge of the first memory area causes a partial or total loss of the history H1, so that it is not always possible for the first device to rely on the history during the processing of a current transaction. The recourse to the generation counter as defined above, and as described below in particular examples, allows solving this problem and thus processing the transactions in a secure manner.

According to one particular example, the processing of the current transaction comprises, before step b):

m) sending to the second device of third data to request the payment by the second device of the amount of said credit to the account associated with the first device, said third data comprising the first generation counter set to the initial value.

According to one particular example, the update l1) is carried out between the sending m) and the receipt b), causing the detection of a mismatch of the first and second generation counters during the verification c).

According to one particular example, the third data further comprise a first public key of the first device, the processing of the current transaction further comprising:

receipt in the second data of a second public key of the first device;

verification that the first and second public keys of the first device coincide;

wherein the current transaction is approved only if the first and second public keys of the first device coincide.

According to one particular example, the third data further comprise a second amount of the credit to be paid, the processing of the current transaction further comprising:

verification that the amount of the credit to be paid and the second amount of the credit to be paid coincide (or verification that the amount of the credit to be paid is greater than the second amount);

in which the current transaction is approved only if the amount of the credit to be paid and the second amount coincide (or if the amount of the credit to be paid is greater than the second amount).

According to one particular example, the first data received at b) comprise:

a first signature calculated from the second data, and a second signature calculated from the second data and from the first signature; the method comprises, after the receipt b):

n) verification of the second signature from the first signature and from the second data received in the first data and from a group public key associated with a group to which the first and second devices belong;

the current transaction being approved only if the result of the verification n) is positive.

According to one particular example, if it is determined during the verification c) that the first and second generation counters have values that are not equal, the current transaction is blocked (or rejected).

According to one particular example, during the verification c), the first device determines that the first and second generation counters have values that do not coincide if the second generation counter received in the second data has an old value set by the first device prior to a previous update l1) of the generation counter (i.e., prior to a last update (or modification) of the generation counter that occurred before the update l1)).

According to one particular example, the first transaction identifier allocated by the second device is a counter representative of a current number of transactions made by the second device.

According to one particular example, during the storage i), the new input is associated with the public key of the second device and with the first transaction identifier;

in which the verification g) comprises:

determination of a second transaction identifier stored, in association with the public key of the second device, in an input detected in the history during the verification e); and comparison of the first transaction identifier with the second transaction identifier, in which the first predetermined condition is detected to be satisfied if the first and second transaction identifiers are different or if the first and second transaction identifiers are counters such that the first transaction identifier is greater than the second transaction identifier.

According to one particular example, the method is implemented by a first virtual wallet implemented by the first device, in cooperation with a second virtual wallet implemented in the second device, the current transaction being a payment transaction of said credit in a cryptographic currency.

According to one particular example, the current transaction is a reputation transaction and the credit paid during said reputation transaction is a reputation credit.

According to one particular embodiment, the first and second devices cooperate during the processing of the current transaction in peer-to-peer mode.

According to one particular example, the first device is a device among: a smart card and a terminal. Likewise, the second device can be a smart card or a terminal. Generally, the first and second devices can comprise a secure element (as developed in more detail below).

According to one particular example, during the detection k), the second predetermined condition is satisfied if the space occupied in the memory area reaches a predetermined portion of the total space of the first memory area.

According to one particular example, in which the update in l1) of the first generation counter is carried out by incrementing the current value of said first generation counter.

According to one particular example, during the eviction l2), the entire first memory area is emptied in order to free memory space.

According to one particular embodiment, during the eviction process l):
the update l1) and the eviction l2) are carried out concomitantly, or
the eviction l2) is carried out after the update l1).

According to one particular example, the update l1) of the first generation counter causes a blocking of all transactions, processed by the first device, for which the second generation counter received at b) has a value which differs from the new value.

According to one particular example, the step of managing the first memory area comprises, in response to the detection k) and before the eviction process l):
o) sending of an online transaction request to an online system comprising at least one server;
p) receipt, in response to said online transaction request, of online transaction data representative of at least one online transaction made by said online system in cooperation with at least one external device to pay a credit to the account associated with the first device, said online transaction data comprising a third generation counter in association with each online transaction; and
q) verification for each online transaction that the first and third generation counters have values that are equal; and
r) update, from the online transaction data corresponding to each online transaction whose third generation counter coincides with the first generation counter, of the account balance stored in the second memory area.

According to one particular example, the eviction process l) comprises, after the update l1):
s) sending to the online system of the first generation counter having the new value assigned at l1), so that the online server can associate the public key of the first device with the first generation counter set to the new value in order to allow its access to at least one external device to process subsequent transactions.

According to one particular example, the sending s) causes the update by the online system of a current value of the third generation counter so that it is equal to the new value.

The disclosure also relates to a second control method implemented by a system comprising a first device implementing a method as defined above and a second device cooperating with the first device, the second method comprising:
t) acquisition, by the second device, of the public key of the second device, of the amount of the credit to be paid during the current transaction, of the second generation counter, and of the first transaction identifier allocated by the second device to the current transaction; and
u) sending, by the second device, to the first device, of the first data comprising the second data, to cause the payment of the amount of the credit to the account associated with the first device.

According to one particular embodiment, the method further comprising:
generation of the first signature calculated from the second data and from the secret key of the second device,
generation of the second signature calculated from the second data, from the first signature and from a group secret key.

In one particular example, the various steps of the control method are determined by computer program instructions.

Consequently, the disclosure also relates to a computer program on an information medium (or recording medium), this program being likely to be implemented in a device (or processing device) or more generally in a computer, this program including instructions adapted to the implementation of the steps of a control method as defined in this document.

This program can use any programming language, and be in the form of source code, object code, or intermediate code between source code and object code, such as in a partially compiled form, or in any other desirable form.

The disclosure also relates to an information medium (or recording medium) readable by a computer or more particularly by a processing device, this information medium including instructions of a computer program as defined in this document.

The information medium can be any entity or device capable of storing the program. For example, the medium can include a storage means, such as a ROM, for example a CD ROM or a microelectronic circuit ROM, or a magnetic recording means, for example a floppy disk or a hard disk.

On the other hand, the information medium can be a transmissible medium such as an electrical or optical signal, which can be conveyed via an electrical or optical cable, by radio or by other means. The program according to the disclosure can be particularly downloaded over an Internet-type network.

Alternatively, the information medium can be an integrated circuit in which the program is incorporated, the circuit being adapted to execute or to be used in the execution of the method in question.

The disclosure also relates to a first device (or first processing device) configured to implement the control method of the disclosure. Particularly, the disclosure relates to a first device able to process transactions in cooperation with a second device, the first device comprising:
a first memory area in which a history able to comprise at least one input representative of a transaction is stored, and a second memory area in which a first generation counter set to an initial value is stored, a receiving module configured to receive, during the processing of a current transaction, coming from the second device, first data comprising second data, said second data comprising:
  a public key of the second device,
  an amount of a credit to be paid during the current transaction,
  a second generation counter, and
  a first transaction identifier allocated by the second device to the current transaction;

a verification module configured to carry out the following steps:
  verification that the first and second generation counters have values that coincide;
  if the first and second generation counters have values that coincide, verification in the first memory area that the history comprises an input associated with the public key of the second device;
  if the history does not comprise an input associated with the public key of the second device, approval of the current transaction;
  if the history comprises an input associated with the public key of the second device, verification that the first transaction identifier satisfies a first predetermined condition indicating the uniqueness of the current transaction;
  if the first transaction identifier satisfies the first predetermined condition, approval of the current transaction;

a storage module configured to store in the history, if the current transaction is approved, a new input associated with the public key of the second device;

an update module configured to update, if the current transaction is approved, an account balance stored in the second memory area, so as to pay the amount of said credit to the account associated with the first device;

a memory management module configured to carry out the following steps:
  detection that the space occupied in the first memory area satisfies a second predetermined condition indicating a risk of saturation of said first memory area; and
  in response to said detection, implementation of an eviction process comprising an update of the first generation counter in the second memory area so as to assign to said first generation counter a new value different from the initial value; and an eviction of at least part of the first memory area in order to free memory space.

The disclosure also relates to a system comprising a first device and a second device for processing a current transaction, as defined in this document.

It will be noted that the different examples mentioned above in relation to the methods of the disclosure as well as the associated advantages apply analogously to the first device and to the system of the disclosure.

According to one example, the disclosure is implemented by means of software and/or hardware components. From this perspective, the term "module" can correspond in this document to a software component, to a hardware component or to a set of hardware and software components.

For each step of the methods of the disclosure, the different elements of the disclosure (particularly: the first device, the second device, the system comprising the first and second devices, as well as the online system) can comprise a corresponding module configured to carry out said step.

A software component corresponds to one or several computer programs, one or several sub-programs of a program, or more generally to any element of a program or software able to implement a function or a set of functions, as described below for the module concerned.

In the same way, a hardware component corresponds to any element of a hardware assembly able to implement a function or a set of functions, according to what is described below for the module concerned. It can be a programmable hardware component or a hardware component with an integrated processor for the execution of software, for example an integrated circuit, a smart card, etc.

BRIEF DESCRIPTION OF THE DRAWINGS

Other characteristics and advantages of the present disclosure will emerge from the description given below, with reference to the appended drawings which illustrate exemplary embodiments without any limitation. On the figures:

FIG. 1 schematically represents an environment comprising a first device able to cooperate with a second device and with an online system and according to one particular aspect of the disclosure;

FIG. 2 schematically represents the structure of a first device according to one particular aspect of the disclosure;

FIG. 3 schematically represents the structure of a second device according to one particular aspect of the disclosure;

FIG. 4 schematically represents modules implemented by a first device according to one particular aspect of the disclosure;

FIG. 5 schematically represents, in the form of a diagram, the steps of a control method according to one particular aspect of the disclosure;

FIG. 6 schematically represents, in the form of a diagram, the steps of a control method according to one particular aspect of the disclosure;

FIG. 7 schematically represents, in the form of a diagram, the steps of a control method according to one particular aspect of the disclosure;

FIG. 8 schematically represents, in the form of a diagram, the steps of a control method according to one particular aspect of the disclosure; and FIG. 9 schematically represents, in the form of a diagram, the steps of a control method according to one particular aspect of the disclosure.

DETAILED DESCRIPTION

As indicated above, the disclosure relates to devices able to process electronic transactions, such as payment transactions or reputation transactions for example, as well as to methods for implementing such transactions.

Particular aspects of the disclosure are described below in the context of payment transactions made electronically from a second device (called "payer" or "debit" device) to a first device (called "receiver" or "credit" device). The disclosure allows in particular a first device to receive in a secure manner, coming from a second device, a payment in a cryptographic currency (or cryptocurrency), that is to say a virtual currency usable on a decentralized computer network.

It should however be noted that the disclosure does not apply exclusively to payment transactions and to devices configured to process this type of transaction, but applies more generally to the processing of any electronic transactions that allow transferring a credit of a certain amount and of a certain nature from a debit device to another credit device. The nature of these credits (numerical value) can be adapted depending on the case. The disclosure applies in particular to the processing of reputation transactions aimed at transferring reputation credits, that is to say credits representative of a reputation associated with an account (or with an individual, a group of individuals, an organization, etc.). Such reputation credits can for example take the form of a "Like" or a score.

The disclosure proposes in particular a control method (also called "method") implemented in a first device able to process transactions in cooperation with a second device, and aims particularly at ensuring efficient management of a memory of the first device, while allowing a secure processing of the transactions. To do so, the disclosure proposes, according to different embodiments, a first device comprising a first memory area able to contain a transaction history, this history can comprise one or several inputs representative of transactions processed by the first device. This control method comprises in particular a processing of a current transaction during which the first device receives transaction data coming from the second device to pay (or transfer) a credit of a certain amount to an account associated with the first device. This processing particularly uses a first generation counter stored in a second memory area of the first device. During the processing of the current transaction, the first device verifies whether this first generation counter coincides (or matches) with a second generation counter provided by the second device in the transaction data. The control method further comprises a step of managing the first memory area during which an eviction process is implemented by the first device so as to update the first generation counter (by incrementation, decrementation, or the like) and to carry out a total or partial eviction (or purge) of the first memory area to free memory space.

As described below, the disclosure also relates to a first corresponding processing device, a second corresponding processing device, a corresponding system comprising the first and second devices, as well as corresponding computer programs. Other aspects and advantages of the present disclosure will emerge from the exemplary embodiments described below with reference to the drawings mentioned above.

Unless otherwise indicated, the elements common or similar to several figures bear the same reference signs and have identical or similar characteristics, so that these common elements are generally not described again for the sake of simplicity.

Unless otherwise indicated, the terms "first", "second", etc. are used in this document by arbitrary convention to allow identifying and distinguishing different elements (such as keys, devices, etc.) implemented in the embodiments described below.

FIG. 1 schematically represents a system SY1 comprising a first device C1, a second device C2 and an online system NT1 (also called Ledger) comprising one or a plurality of servers SV. The first device C1 is able to process transactions in cooperation with the second device C2. To do so, the first device C1 can receive, via a communication link L1, offline transactions TRX (in peer-to-peer mode), in the form of transaction data aimed at transferring or paying a credit CR from the second device C2 acting as a debit device, to the first device C1 acting as a credit device, without involving the online system NT1.

The online system NT1 comprises at least one remote server SV configured to process online transactions TRY aimed at transferring credits CR to the first device C1 acting as a credit device. Thus, the first device C1 can cooperate via a second communication link L2 with the online system NT1 in order to receive credits CR during online transactions TRY.

As already indicated, it is subsequently assumed that the credits CR transferred (or paid) to the first device C1 (or more particularly to an account U1 associated with this first device C1) are credits in cryptographic currency. The cryptographic currency used can be any cryptographic currency (in Ether, for example), it being understood that credits other than those in cryptocurrency are also possible. Particularly, the disclosure allows the allocation or the payment of reputation credits (for example in the form of "Like", or in the form of a score or points) to an account associated with the first device C1. These credits CR can be transmitted during a transaction so as to be paid to the account of the first device C1.

The first and second devices C1, C2 together form a system denoted SY2 capable of processing offline transactions TRX as already indicated.

It is subsequently assumed that the offline transactions TRX processed by the first device C1 in cooperation with the second device C2, as well as the online transactions TRY processed by the first device C1 in cooperation with the online system NT1, are payment transactions, such as for example Ether transactions, although other examples are possible.

It is assumed in the following exemplary embodiments that the first and second devices C1, C2 (also called processing devices) are terminals, such as smartphones, tablets, portable computers or the like. These devices C1 and C2 can however take other forms (fixed or mobile forms), such as in particular fixed terminals (servers, etc.), smart cards, USB keys, connected objects, etc. Alternatively, the at least one of the devices C1 and C2 can in particular be a payment card in ISO/IEC 7816 ID1 format (for example the device C2 is a payment card in ISO/IEC 7816 ID1 format while the device C1 is any terminal able to cooperate with this card, or vice versa).

Furthermore, the at least one of the terminals C1, C2 (or both) can comprise a secure element. In this case, the transaction processing steps (as described later) are carried out by the secure elements embedded respectively by the terminals C1, C2. As defined by the "GlobalPlatform" standardization organization well known to those skilled in the art, a secure element is a hardware and software platform configured to securely host applications and their associated sensitive data (cryptographic keys, algorithms, etc.), in accordance with rules set by a trusted third-party authority. A secure element provides a secure execution environment to applications. It can take various forms, such as a UICC (Universal Integrated Circuit Card) module, an embedded secure element (or "embedded SE" or "eSIM") or a microSD card. A UICC module and a microSD card are generally removable. Each form of secure element is intended to be used in very specific applications and must meet requirements specific to the concerned market.

As represented in FIG. 1, it is assumed by way of example that the terminals C1 and C2 respectively embed secure elements SE1 and SE2, which can take for example here the form of a SIM card, eSIM card, or the like.

It is assumed here that the communication links L1 and L2 are any wireless links, although it is also possible to implement the disclosure with wired links. The exchanges of data between the devices C1 and C2 can also be done by the acquisition of barcodes of the QR code (quick response code) type.

FIG. 2 represents, according to one particular embodiment, the structure of the first terminal C1 described above with reference to FIG. 1. More specifically, the terminal C1 comprises in this example a processor 2, a volatile memory 4, a non-volatile memory 6, a rewritable non-volatile memory MR1 and a communication interface INT1.

According to one particular example, the elements 2, 4, 6 and MR1 as well as possibly the interface INT1 are comprised in the secure element SE1 (in the case where such a secure element is present).

The non-volatile memory 6 (of Flash, ROM type or the like) constitutes in this example a recording medium (or information medium) in accordance with one particular embodiment, readable by the terminal C1, and on which a computer program PG1 in accordance with one particular embodiment is recorded. This computer program PG1 includes instructions for the execution of the steps of a control method according to one particular embodiment. The steps of this method are described later, in particular aspects of the disclosure.

The processor 2 controls the different components (memories, communication interface, etc.) and uses the volatile memory 4 to perform the different operations and functions necessary for the operation of the first device C1, also to execute the computer program PG1 during the implementation of the control method of the disclosure.

According to one particular example, the processor 2 is driven by the program PG1 to implement a virtual wallet intended to carry out a control method in accordance with the disclosure. This virtual wallet can particularly allow managing a user account U1 associated with the terminal C1 and making transactions in cryptographic currency (for example in Ether or any other appropriate cryptocurrencies) with a third-party account U2 associated with the terminal C2.

It should be noted that the terminal C1 can in a particular example comprise several distinct user accounts U1 each allowing receiving payments from a third-party account associated with an external device such as the terminal C2.

In the example considered here, the rewritable non-volatile memory MR1 comprises two distinct memory areas denoted Z1 and Z2. These memory areas Z1 and Z2 can be formed on the same physical memory MR1 of the terminal C1 or, alternatively, be formed in separate physical memories.

The first memory area Z1 is configured to store a history (or transaction history) H1 able to contain history data DH1, in particular in the form of inputs EN. The history H1 can thus comprise one or several inputs EN, each of these inputs EN being representative of a past transaction processed by the device C1 and during which a credit CR was paid from a third-party account to the account U1 associated with the terminal C1.

More specifically, each input EN is associated in this example with a public key of a debit device which is at the origin of the payment of the corresponding credit CR. As described below, in addition to this public key, each input EN can also be associated with a transaction identifier. As represented in FIG. 2, it is assumed in this example that the history H1 is in an initial state in which it comprises at least one input EN1 associated with a public key PK2 of the device C2 and with a transaction identifier denoted nonce1. Other exemplary embodiments are however possible without the use of such a transaction identifier nonce1.

It should be noted that other parameters characterizing transaction data can also be included in the transaction data DH1 although this is not necessary to implement the disclosure.

Furthermore, the second memory area Z2 is configured to store a first generation counter GEN1 which is initially set to an initial value Val1 in this example. As will appear more clearly subsequently, the value of the generation counter GEN1 can be any integer, this number allowing securing the processing of transactions processed by the terminal C1.

The second memory area Z2 further comprises in this example a first pair of cryptographic keys PK1/SK1 and a second pair of cryptographic keys PK/SK. In this example, PK1 is a public key of the terminal C1 while SK1 is a private key of the terminal C1, these two keys being complementary to each other. Similarly, PK is a group public key and SK is a group private key, these two keys being complementary to each other and being associated with a group to which the terminals C1 and C2 belong. Other implementations of the disclosure are however possible in particular without having to use the group keys PK and SK.

In this document, the keys mentioned are cryptographic keys. A key is called "private" key when it is secret, as opposed to public key.

The terminal C1 (for example its virtual wallet) can use the keys PK1/SK1 and PK/SK of the user account U1 to sign transaction data or verify the signature of transaction data during the processing of transactions.

According to one particular example, the pair of keys PK1/SK1 (and possibly the pair of keys PK/SK) is calculated on the fly by the terminal C1 from a data (called seed; not represented in the figure) which can be stored in the second memory area Z2.

In this example, the second memory area Z2 also comprises an account balance ACN1 associated with the account U1 of the terminal C1. This account balance ACN1 is a parameter which specifies a current balance of the account U1 associated with the terminal C1. This balance can in particular be credited with an amount when a credit CR is paid to the account U1 (or can also be debited with an amount when a credit is withdrawn and paid from the account U1 to a third-party account such as the account U2).

FIG. 3 represents, according to one particular example, the structure of the second terminal C2 described above with reference to FIG. 1. More specifically, the terminal C2 comprises in this example a processor 22, a volatile memory 24, a non-volatile memory 26, a rewritable non-volatile memory MR2 and a communication interface INT2.

The non-volatile memory 26 (of Flash, ROM type or the like) constitutes in this example a recording medium (or information medium) in accordance with one particular example, readable by the terminal C2, and on which a computer program PG2 in accordance with one particular example is recorded. This computer program PG2 includes instructions for the execution of the steps of a control method according to one particular example in cooperation with the terminal C1. The steps of this method are described later, in particular aspects of the disclosure.

According to one particular example, the terminals C1 and C2 have an analogous structure and are configured analogously so that the terminals C1 and C2 can cooperate together to make offline payments from C2 to C1 and vice versa, although other implementations are possible (in which for example the terminal C1 is only configured to receive credits CR while the terminal C2 is only configured to pay credits).

For the sake of simplicity, only some elements useful for the description of the disclosure have been represented in FIG. 3 and described in this document.

It is assumed in this example that the terminal C2 comprises in its non-volatile memory MR2 a first pair of cryptographic keys PK2/SK2 and a second pair of cryptographic keys PK/SK. In this example, PK2 is a public key of the terminal C2 while SK2 is a private key of the terminal C2, these two keys being complementary to each other. Similarly, PK and SK are respectively the group public key and the group private key available to the terminal C2 (just like the terminal C1) as a member of a group comprising the terminals C1 and C2. As already indicated, embodiments are however possible without in particular the use of the group keys PK/SK.

In this example, the non-volatile memory MR2 can also contain a transaction identifier nonce2 allocated by the second device C2 to a current transaction.

The non-volatile memory MR2 of the terminal C2 can also contain an account balance ACN2 associated with the account U2 of the terminal C2. As for ACN1, the account balance ACN2 is a parameter which specifies a current balance of the account U2 associated with the terminal C2. This balance can in particular be debited with an amount when a credit CR is transferred from the account U2 to a third-party account such as the account U1 (or can be credited with an amount when a credit is received on the account U2).

Although this is not represented, the memory MR2 can also store other elements, such as a generation counter denoted GEN1a associated with the terminal C1. As described below, if the terminals C1 and C2 are synchronized, the generation counter GEN1a stored in the memory MR2 of the terminal C2 is identical to the generation counter GEN1 stored in the second memory area Z2 of the terminal C1. If, on the other hand, the terminals C1 and C2 are desynchronized, the generation counter GEN1a stored in the memory MR2 of the terminal C2 is different from the generation counter GEN1 stored in the second memory area Z2 of the terminal C1.

The terminal C1 and the terminal C2 are configured to use their respective communication interfaces INT1, INT2 in order to communicate together. Thus, the communication interfaces INT1 and INT2 can be configured to establish an offline communication link L1. (in peer-to-peer mode, i.e., that does not go through the online system NT1, as already indicated). The communication link L1 can for example be a wireless link (Bluetooth, Wi-Fi, NFC, etc.) or a wired link.

It should be noted that the system SY2, and more particularly the devices C1 and C2 represented in FIGS. 1-3, only constitute particular exemplary embodiments, other implementations being possible within the framework of the disclosure. Those skilled in the art understand particularly that some elements of the terminal C1 represented in FIG. 2 and of the terminal C2 represented in FIG. 3 are only described here to facilitate the understanding of the disclosure, these elements not being necessary to implement the disclosure.

Furthermore, FIG. 4 represents, according to one particular example, modules implemented by the processor 2 driven by the computer program PG1 within the terminal C1. These modules comprise a receiving module MD4, a verification module MD6, a history management module MD8, an account management module MD10 and a memory management module MD12. According to one particular example, the processor 2 driven by the program PG1 also implements a sending module MD2, although embodiments without this module in particular are possible.

More particularly, the receiving module MD4 is configured to receive, during a current transaction, first data DT3 coming from the second device C2. These first data DT3 comprise second data DT2 which can themselves comprise: the public key PK2 of the second device C2, an amount MT1a of the credit CR1 to be credited (or paid) during the current transaction, a generation counter GEN1a and a first transaction identifier nonce2 allocated by the second device C2 to the current transaction.

According to one particular example, the first transaction identifier nonce2 allocated by the second terminal C2 is a counter representative of a current number of transactions made by the second terminal C2.

As described below, particular embodiments are possible in which the data DT3 comprises signatures in addition to the data DT2.

The verification module MD6 is configured to verify that the first generation counter GEN1 stored in the memory area Z2 and the second generation counter GEN1a received have values that coincide. If so, the verification module MD6 is configured to verify in the first memory area Z1 that the history H1 comprises an input EN associated with the public key PK2 of the second device C2. If the history H1 does not comprise any input EN associated with the public key PK2 of the second device C2, the verification module MD6 is configured to approve the current transaction.

Otherwise (an input EN is detected), the verification module MD6 is configured to verify that the first transaction identifier nonce2 satisfies a first predetermined condition (denoted CD1) indicating the uniqueness of the current transaction. In this case, if it is detected that the first condition is satisfied, the verification module MD6 is configured to approve the current transaction.

Furthermore, if the current transaction is approved:
the history management module MD8 is configured to store (or record) in the history H1 a new input EN associated with the public key PK2 of the second device C2; and
the account management module MD10 is configured to update the account balance ACN1 in the second memory area Z2 so as to pay the amount of the credit to the account U1 associated with the first device C1.

In addition, the memory management module MD12 comprises a detection module MD14, an update module MD16 and an eviction module MD18. More particularly, the detection module MD14 is configured to detect that the space occupied in the first memory area Z1 satisfies a second predetermined condition (denoted CD2) indicating a (next or imminent) risk of saturation of the first memory area Z1. In response to this detection, the memory management module MD12 is configured to perform an eviction process during which:
the update module MD16 updates the first generation counter GEN1 in the second memory area Z2 of the device C1 so as to assign to the first generation counter GEN1 a new value (denoted Val2) different from the initial value Vail; and
the eviction module MD18 evicts (in other words, empties) at least part of the first memory area Z1 in order to free memory space.

The operation and the configuration of the modules MD2-MD18 of the device C1 will appear more specifically in the exemplary embodiments described below. It should also be noted that the modules MD2-MD18 as represented in FIG. 4 only constitute an exemplary implementation of the disclosure.

One particular aspect of the disclosure is now described with reference to FIGS. 5-6. More specifically, the terminal C1 represented in FIGS. 1, 2 and 4 executes the computer program PG1 to implement a control method according to one particular example. Similarly, the terminal C2 represented in FIGS. 1 and 3 executes the computer program PG2 to implement a control method collectively with the terminal C1, according to one particular example.

It is assumed in this example that a user uses the terminal C1 to receive a credit CR1 coming from the terminal C2 of another user during an offline current transaction TR1 (in peer-to-peer mode, i.e. without the online system NT1 acting as an intermediary between the terminals C1 and C2 to process the current transaction TR1). As already indicated, it is a payment transaction intended to pay a credit CR1 in cryptographic currency (in Ether or the like) from the account U2 associated with the terminal C2 to the account U1 of the terminal C1. Such a transaction is made for example when a merchant using the terminal C1 tries to receive a payment from a client using the terminal C2. To do so, the terminal C1 cooperates with the terminal C2 in order to exchange data necessary for the execution of the transaction TR1.

As represented in FIG. 5, it is assumed that the current transaction TR1 between the terminal C1 and the terminal C2 is initiated during an initiation step A1.

During a sending step B20, the terminal C2 sends first transaction data DT3 which are received at A20 by the terminal C1. As described below, the terminal C2 sends at B20 these data DT3 to cause the payment of an amount MT1$a$ of the credit CR1 to the account U1 associated with the terminal C1.

More particularly, the first transaction data DT3 comprise second data DT2 and can optionally also comprise other data which will be described later in one particular example. The second data DT2 comprise:
 a public key PK2 of the terminal C2,
 an amount MT1$a$ of the credit CR1 to be credited (or paid) during the current transaction TR1,
 a generation counter GEN1$a$, and
 a first transaction identifier nonce2 allocated by the second terminal C2 to the current transaction TR1.

According to one particular example, the first transaction identifier nonce2 allocated by the second terminal C2 is a counter representative of a current number of transactions made by the second terminal C2 to pay a respective credit CR.

It should be noted that the way in which the terminal C2 acquires (obtains) these second data DT2 beforehand may vary depending on the case, some particular examples being described later.

During a verification step A26, the terminal C1 verifies that the generation counter GEN1$a$ received at A20 in the data DT2 coincides (or matches) with the generation counter GEN1 stored in its second memory area Z2. To do so, the terminal C1 compares the value of the generation counter GEN1$a$ with the initial value Vail of the generation counter GEN1. In this example, the terminal C1 verifies whether the counters GEN1 and GEN1$a$ are identical. To this end, the terminal C1 can, prior to the verification step A26, consult its second memory area Z2 to determine the generation counter GEN1 at a current time during which the current transaction TR1 is processed.

If the result of the verification A26 is negative (GEN1 and GEN1$a$ do not coincide), terminal C1 blocks (A28) or denies (or rejects) the transaction TR1.

If, on the other hand, the result of the verification A26 is positive (GEN1 and GEN1$a$ coincide), the terminal C1 verifies (A30) in the first memory area Z1 that the history H1 comprises an input EN associated with the public key PK2 of the second terminal C2.

If the result of the verification A30 is negative (no input EN detected), the terminal C1 approves (A32) the current transaction TR1. The absence of input EN associated with the public key PK2 in the history H1 means that the terminal C1 has no knowledge of any old transaction during which it would have received a payment from the terminal C2.

Otherwise (such an input EN is detected), the terminal C1 verifies (A34) that the first transaction identifier nonce2 satisfies a first predetermined condition CD1 indicating the uniqueness of the current transaction TR1. In other words, this verification A34 allows determining whether the current transaction TR1 is unique from the point of view of the terminal C1 or whether, on the contrary, the terminal C1 has already previously processed this same transaction TR1, corresponding to the same payment, with the terminal C2. To do so, the terminal C2 allocates a unique transaction identifier (generally denoted "nonce") for each new transaction it processes during a payment to a third-party terminal. In this particular example, the terminal C1 can thus verify, from the transaction identifier nonce2 received at A20, that the current transaction TR1 indeed constitutes a new transaction and not an old transaction already made with the terminal C2.

As described later, the terminal C1 can verify at A34 the transaction identifier nonce2 in various ways. The predetermined condition CD1 can thus be adapted as appropriate. By way of example, the terminal C1 can compare the transaction identifier nonce2 with at least one transaction identifier previously recorded in its memory area Z2.

According to one particular example, it is assumed that the input EN1 associated with the public key PK2 of the terminal C1 is detected during the verification A30 in the history H1 stored in the first memory area Z1. This history input EN1 is representative of one (or at least one) past transaction during which the same terminal C2 paid a credit CR to the terminal C1. In other words, the presence of this input EN1 means that the terminal C1 is aware of a past transaction during which it received a payment from the terminal C2.

This input EN1 detected at A30 can further comprise a second transaction identifier nonce1 which identifies the most recent transaction (other than the current transaction TR1) during which a credit CR was received by the terminal C1 coming from the terminal C2. As for the transaction identifier nonce2, the transaction identifier nonce1 can be a transaction counter which was previously allocated by the terminal C2 to this old transaction and sent by the terminal C2 to the terminal C1 during said old transaction.

Thus, the predetermined condition CD1 can be defined from the transaction counter nonce1 prerecorded in the history input H1 in association with the public key PK2. For example, the condition CD1 is fulfilled if the identifiers nonce1 and nonce2 are different. According to another example, the transaction identifiers nonce1 and nonce2 are counters and the condition CD1 is fulfilled if nonce2>nonce1.

If the result of the verification A34 is negative (the identifier nonce2 does not fulfill the condition CD1), the terminal C1 blocks (A36) or rejects the current transaction TR1, because this means that the terminal C2 (or another device acting as the terminal C2) tries to repeat a transaction to pay credits CR1 which have already been paid by the terminal C2 to the terminal C1.

If, on the other hand, the result of the verification A34 is positive (the identifier nonce2 fulfills the condition CD1), the terminal C1 approves (A38) the current transaction TR1 and carries out a storage step A40 and an update step A42 (FIG. 5) during the processing of the current transaction TR1.

More particularly, during the storage step A40, the terminal C1 stores (or records) in the history H1 a new input EN2 associated with the public key PK2 of the second terminal C2. This new input EN2 can replace the old input EN1, in a case for example where the terminal C1 keeps only one input EN in the history H1 for each debit device from which it receives a credit CR during a transaction. This replacement can be done by an update causing the conversion of the old input EN1 into the new input EN2. Alternatively, the old input EN1 is kept in the history H1 in addition to the new input EN2. In other words, the new input EN2 is added in the history H1 as the most recent input in association with the public key PK2 of the terminal C2, without necessarily overwriting the old input EN1.

This new input EN2 can be associated not only with the public key PK2 of the second terminal C2, but also with the transaction identifier nonce2 received at A20 from the terminal C2. This transaction identifier nonce2 can possibly be used by the terminal C1 during a next transaction during which the terminal C2 tries to make a credit payment CR to the terminal C1 (as described above with reference to step A34 (FIG. 5).

In addition, during the update step A42, the terminal C1 updates the account balance ACN1 stored in the second memory area Z2, so as to pay the amount MT1a of the credit CR1 to the account U1 associated with the first terminal C1. This update amounts, for example, to incrementing the balance ACN1 by the amount MT1a.

Furthermore, FIG. 6 represents a step A60 of managing the first memory area Z1, this step comprising a detection step A62 and an eviction process A74. As indicated below, this management step A60 can be triggered at various moments, in response to a triggering event detected at A62.

Particularly, the management step A60 can be carried out before the start of the transaction TR1, or after completion of the processing of the transaction TR1, depending on the moment when the triggering event is detected. The management step A60 can also take place during the current transaction with the exception of the following times:

Between and during the step of consulting the second memory area (Z2) to determine the first generation counter (GEN1) at a current time during which the current transaction is processed and step A30, if the test of step A26 is positive.

Between and during the step of consulting the second memory area (Z2) to determine the first generation counter (GEN1) at a current time during which the current transaction is processed and step A26, if the test of step A26 is negative.

Between and during the step of consulting the second memory area (Z2) to determine the first generation counter (GEN1) at a current time during which the current transaction is processed and step A40.

Depending on the moment when this management step A60 is carried out, the outcome of the processing of the current transaction TR1 may vary, more particularly with regard to the result of the verification A26 which aims at determining whether the current generation counter GEN1 stored in the second memory area Z2 coincides with the generation counter GEN1a provided at A20 by the terminal C2.

More specifically, as represented in FIG. 6, the terminal C1 detects during a detection step A62 that the space—denoted ESP1—occupied in the first memory area Z1 satisfies a second predetermined condition CD2 indicating a risk of (next or imminent) saturation of the first memory area Z1 (triggering event). The terminal C1 can verify periodically, or at certain predefined times (for example during each processed transaction) whether the condition CD2 is satisfied.

The predetermined condition CD2 can be adapted by those skilled in the art according to the memory space requirements specific to each use case, and according for example to the size of the memory area Z1. The condition CD2 can for example define a predetermined threshold TH beyond which the occupied space ESP1 in the memory area is considered to be critical and therefore as constituting a risk of saturation of the memory area Z1. According to one particular example, the terminal C1 detects at A62 a risk of saturation of the memory area Z1 if the occupied space ESP1 reaches at least one threshold value TH, this value possibly being equal for example to a predetermined ratio (or portion) of the total size of the memory area Z1.

In response to the detection at A62 that the first memory area Z1 may be saturated, the terminal C1 performs an eviction process A74 comprising an update A76 and an eviction A78.

More specifically, during the update step A76, the terminal C1 updates the first generation counter GEN1 in the second memory area Z2 so as to assign to the first generation counter GEN1 a new value—denoted Val2—different from the initial value Vail. This update A76 can consist for example of incrementing (or decrementing) the value of the generation counter GEN1 stored in the memory area Z2.

According to one particular example, the terminal C1 assigns to the generation counter GEN1 a new value Val2 which differs from any other previous value assigned in the past to the generation counter GEN1. A random allocation mechanism is also possible.

In addition, during the eviction step A78, the terminal C1 evicts (or purges) at least part of the first memory area Z1 (or even the entire memory area Z1) in order to free memory space. In other words, the terminal C1 deletes all, or only part, of the content of the memory area Z1, in order to free memory space. According to one particular example, the eviction A78 comprises a purge (or deletion) of all or part of the history H1 stored in the memory area Z1.

The update A76 (FIG. 6) of the first generation counter GEN1 causes a blockage (or rejection) of all transactions, processed by the terminal C1, for which the second generation counter GEN1a received at A20 (FIG. 5) has a value which differs from the new value Val2 allocated at A76 to the generation counter GEN1.

Particularly, during the verification A26 (FIG. 5), the first terminal C1 can determine that the first and second generation counters GEN1 and GEN1a have values which do not coincide if the second generation counter GEN1a received in the data DT2 at A20 has an old value set by the first terminal C1 prior to a previous update (for example the last update) of the generation counter GEN1, that is to say prior to a previous occurrence of the update A76 during the processing of a previous transaction (FIG. 6). The mismatch (or desynchronization) of the generation counters GEN1 and GEN1a then leads the terminal C1 to block (or reject) the current transaction TR1 at A28 as already described above with reference to FIG. 5.

The disclosure allows efficiently managing the memory of the terminal C1, without compromising the security of the transactions made. Indeed, the transaction history H1 increases in size as new credits are received by the terminal C1. The management step A60 (FIG. 6) allows freeing memory space in the first memory area Z1 if necessary, that is to say when a risk of saturation of this memory area is detected, so that there is always sufficient memory space to record a recent history of transactions.

To do so, an eviction process is performed to delete all or part of the memory area Z1 upon detection that this memory Z1 may be soon saturated. By deleting particularly all or part of the history H1, it is possible to avoid reaching the saturation of the memory area Z1, which would cause difficulties of operation of the terminal C1. This memory eviction (or purging) mechanism is all the more useful as the memory resources may be relatively limited in some types of devices C1, such as mobile terminals, smart cards, etc.

Furthermore, the management of the first memory area Z1 is carried out at A60 while guaranteeing the security of the transactions, including those made in offline mode by the device C1 with external devices such as the device C2. Particularly, the disclosure allows avoiding double payments, and more generally guaranteeing that the same debit device cannot pay the same credits to a credit device several times. Indeed, the purge of the memory area Z1 leads to a partial or total loss of the history H1, so that it is not always possible for the terminal C1 to rely on the history H1 during the processing of a current transaction.

Also, to overcome the problem of the loss of history, the disclosure introduces the use of generation counters as described above. Thus, each time an eviction of the memory area Z1 is carried out (A78, FIG. 6), the terminal C1 also allocates (A76) a new value to the generation counter GEN1. Once the update A76 (FIG. 6) has been carried out, the terminal C1 can transmit the up-to-date generation counter GEN1 (GEN1=Val2) to the terminal C2 so that the latter can use it to make a payment. The terminal C2 can alternatively obtain the up-to-date generation counter in other appropriate ways.

An external device such as the terminal C2 can thus make a payment of a credit CR to the terminal C1 successfully only if it has the up-to-date generation counter associated with the terminal C1. If the terminal C2 provides at B20 (FIG. 5) to the terminal C1 a generation counter GEN1a which differs from the up-to-date generation counter GEN1 (i.e. if GEN1a≠val2), then the transaction is denied (A28). If, on the other hand, the counters GEN1 and GEN1a coincide (GEN1=GEN1a), then the terminal C1 can consult at A30 its history H1 to verify whether there is an input EN associated with the public key PK2.

The use of the history H1 therefore allows securing the transactions and in particular preventing double payments (by sending the same transaction data several times from the same device C2). In addition, the use of the generation counters allows, in case of purge of the history H1 in the terminal C1, guaranteeing that a debit device C2 cannot use transaction data which have already been used to transfer a credit CR from the debit device C2 to the terminal C1 during a transaction prior to the purge, while this prior transaction no longer appears in the history H1 due to the purge. Thanks to the disclosure, if the terminal C2 tries to pay a credit CR during a current transaction by using a generation counter which is prior to a purge of the memory area Z1, the terminal C1 blocks the transaction insofar as the history H1 stored in the first memory area Z1 is not reliable for processing this current transaction (whether this history H1 is empty or not).

According to a first variant, during the eviction process A74 (FIG. 6), the terminal C1 carries out concomitantly (or simultaneously) the update A76 of the generation counter GEN1 and the eviction A78 of the memory area Z1. In other words, the update A76 and the eviction A78 are carried out atomically, which has the effect that these steps A76 and A78 are effective only if they are both carried out during the eviction process A74. According to a second variant, the eviction A78 is carried out after the update A76 of the generation counter GEN1. These two variants of embodiment allow further enhancing the security of the terminal C1 by preventing a security breach which could occur if the eviction process A74 were suspended (for example due to a power shutdown) while the eviction A78 of the memory area Z1 has been executed without the generation counter GEN1 having been updated (A76).

One particular aspect of the disclosure is now described with reference to FIGS. 7-9. More specifically, the terminal C1 represented in FIGS. 1, 2 and 4 executes the computer program PG1 to implement a control method according to one particular example. Similarly, the terminal C2 represented in FIGS. 1 and 3 executes the computer program PG2 to implement a control method collectively with the terminal C1, according to one particular example.

It is also assumed in this example that a user uses the terminal C1 to receive a credit CR1 coming from the terminal C2 of another user during a current transaction TR1. As already indicated, it is a payment transaction intended to pay a credit CR1 in cryptographic currency (in Ether or the like) from the account U2 associated with the terminal C2 to the account U1 of the terminal C1. Such a transaction is made for example when a merchant using the terminal C1 tries to receive a payment from a client using the terminal C2. To do so, the terminal C1 cooperates with the terminal C2 in order to exchange data necessary for the execution of the transaction TR1.

As represented in FIG. 7, it is assumed that the current transaction TR1 between the terminal C1 and the terminal C2 is initiated at A1 according to any appropriate manner. The terminal C1 then performs a processing of the transaction TR1 (steps A2-A42) by cooperating with the terminal C2 via the communication link L1 (FIG. 1).

More specifically, during a sending step A2, the first terminal C1 sends data DT1 to the second terminal C2 in order to request the payment by the second terminal C2 of a credit CR1 of the amount MT1 to the account U1 associated with the first terminal C1, these data DT1 comprising the generation counter GEN1 set to the initial value Val1. In other words, the data DT1 sent at A2 comprise the requested amount MT1 and the generation counter GEN1. To do so, the terminal C1 can, prior to the sending step A2, consult its second memory area Z2 to determine the generation counter GEN1 at a current time during which the current transaction TR1 is processed.

As represented in FIG. 7, the first data DT1 can optionally also comprise the public key PK1 of the terminal T1.

The second terminal C2 receives the first data DT1 at B2 (FIG. 7).

It should be noted that the generation counter GEN1 provided at A2 by the terminal C1 is up to date, in the sense that it is the one currently stored in the memory area Z2 at the moment of the current transaction TR1. Providing the generation counter GEN1 at A2 to the terminal C2 allows the latter carrying out the credit transfer. However, other examples are possible in which the terminal C2 obtains the generation counter GEN1 in another way. For example, the terminal C2 can receive this counter from another terminal or server (for example from the online system NT1). Alternatively, a user can enter the generation counter GEN1 into the terminal C2 via a user interface.

According to one variant of embodiment, the terminal C1 sends to an external terminal (for example to the online system NT1) the first generation counter GEN1 so that it is accessible by the terminal C2.

Similarly, variants are possible in which the terminal C1 does not provide at A2 (FIG. 7) at least one among the public key PK1 and the requested amount MT1. It is thus possible to envisage that the terminal C2 obtains the public key PK1 and/or the requested amount MT1 in another way. The terminal C2 can for example have the public key PK1 in memory, for example because it has already processed a transaction in the past with the terminal C1. It is also possible to envisage that a user enters the desired amount MT1 in the terminal C2 via a user interface.

During a generation step B4, the terminal C2 calculates a signature S from second data DT2. More specifically, in this example the terminal C2 generates (B4) the first signature S from the second data DT2 by using the private key SK2 of the terminal C2. In other words, the terminal C2 signs the second data DT2 by means of the private key SK2 so as to produce the first signature S, which can be formulated as follows:

$$S = \mathrm{sign}(DT2)_{SK2} \quad \text{[Math. 1]}$$

The second data DT2 used by the terminal C2 to generate the first signature S comprise in this example:
the public key PK2 of the terminal C2 (which is complementary to the private key SK2),
a public key PK1$a$,
an amount denoted MT1$a$ of the credit CR1 that the terminal C2 is about to pay during the current transaction TR1;
a generation counter GEN1$a$, and
a transaction identifier nonce2 which is allocated by the terminal C2 to the current transaction TR1.

It is assumed in this example that the terminal C2 is the legitimate terminal supposed to cooperate with the terminal C1 during the current transaction TR1 to pay a credit CR1 to the terminal C1 since it is indeed the terminal C2 that received at B2 the data DT1. Also, the public key PK1$a$ used by the terminal C2 in the second data DT2 is identical to the public key PK1 received at B2 in the first data DT1. Similarly, the amount MT1$a$ used by the terminal C2 in the second data DT2 is identical to the amount MT1 received at B2 in the first data DT1. In the same way, the generation counter GEN1$a$ used by the terminal C2 in the second data DT2 is identical to the generation counter GEN1 received at B2 in the first data DT1. These parameters PK1$a$, MT1$a$ and GEN1$a$ used by the terminal C2 as data DT2 will however be verified later by the terminal C1 to ensure that the current transaction TR1 is valid.

It should also be noted that the transaction identifier nonce2 used by the terminal C2 can be any identifier or a counter. According to one particular example, for each new transaction during which the terminal C2 acts as a debtor (payer), the terminal C2 increments the value of the transaction identifier nonce2 so that this identifier has a different value for each transaction.

Alternatively, the transaction identifier nonce2 is not allocated by the terminal C2 but defined by a user, or determined by an external entity (for example the online system NT1) and provided beforehand to the terminal C2 to process the current transaction TR1.

During a generation step B6, the terminal C2 then calculates a second signature, called "super signature", from the second data DT2 and the first signature S. More specifically, in this example the terminal C2 generates (B6) the second signature SS from the second data DT2 and from the signature S, by using the group private key SK available to the terminal C2. In other words, the terminal C2 signs the second data DT2 associated with the signature S by means of the group private key SK so as to produce the second signature SS, which can be formulated as follows:

$$SS = \mathrm{sign}(DT2, S)_{SK} \quad \text{[Math. 2]}$$

As will appear subsequently, the signatures S and SS allow the terminal C1 to subsequently verify that the terminal C2 with which it cooperates during the current transaction TR1 is indeed legitimate, thus making the processing of the transactions even more secure. It should however be noted that other embodiments are possible without the use of these signatures S and SS, as appears in particular with reference to FIGS. 5-6.

As represented in FIG. 7, the terminal C2 also carries out two update steps B8 and B10. More particularly, during the update step B8, the terminal C2 updates the transaction counter nonce2 stored in this example in its memory MR2. As already indicated, the transaction identifier nonce2 has been previously allocated (or defined) by the terminal C2 to identify the current transaction TR1. This identifier nonce2 can particularly be a counter representative of a current number of transactions made by the terminal C2. During the update B8, the terminal C2 can for example increment or decrement the current value of the counter nonce2. It is assumed for example here that the terminal C2 increments by 1 the value of the counter nonce2 at B18. Other update mechanisms (decrementation, etc.) are however possible.

Moreover, during the update B10, the terminal C2 updates the account balance ACN2 associated with the account U2 of the terminal C2 so as to subtract from the account balance ACN2 the amount MT1$a$ of the current transaction TR1. In other words, the account balance ACN2 is debited with the amount MT1$a$ which is supposed to be equal to the amount MT1 requested by the terminal C1. Alternatively, this update step B10 is carried out subsequently, for example once the terminal C1 informs the terminal C2 that the payment of the credit CR1 has been approved.

It should also be noted that the order in which steps B4 to B10 are carried out can be adapted depending on the case.

During a sending step B12 (FIG. 7), the terminal C2 sends third data DT3 to the terminal C1 to make the payment, from the account U2 of the terminal C2 to the account U1 of the terminal C1, of the credit CR1 corresponding to the amount MT1$a$. These third data DT3 comprise the second data DT2 used at B4 and B6 to calculate the signatures S and SS, as well as the signatures S and SS.

As represented in FIG. 8, the terminal C1 receives at A20 the data DT3 coming from the terminal C2.

During a verification step A21, the terminal C1 verifies the super signature SS received in the data DT3 from the first signature S and the data DT2 also present in the data DT3 and from the group public key PK available to the terminal C1 in its memory area Z2. As already indicated, the group public key PK is associated with a group to which the first and second terminals C1, C2 belong.

In this particular example, to verify (A21) the validity of the super signature SS, the terminal C1 carries out steps A22 and A23 (FIG. 8). More specifically, the terminal C2 executes (A22) a hash function (denoted "Hash") from the data DT2 and from the first signature S, so as to obtain a digital fingerprint h (commonly called the "hash"). In other words:

$$h = \text{Hash}(DT2, S) \quad [\text{Math. 3}]$$

Since the hashing technique is well known to those skilled in the art, it will not be described in detail in this document.

The terminal C2 then compares (A23) the digital fingerprint h with a parameter x which is such that:

$$x = SS^e \bmod N$$

where SS is the super signature, the parameters e and N are defined by the group public key PK, and mod corresponds to the "modulo" function. The exponent e in the expression above is called the public exponent. N corresponds to the RSA module (as used in an RSA cryptographic signature or in an RSA cryptosystem). For this purpose, it is for example possible to use PKCS #1 which is a standard for the RSA cryptosystem.

The terminal C2 detects at A23 that the super signature SS is valid if the digital fingerprint h is equal to the parameter x calculated from the super signature SS and from the group public key SK. If the super signature SS is not valid, the terminal C2 blocks (or rejects) the transaction TR1 and the method ends.

Thus, the current transaction TR1 is approved by the terminal C1 only if the result of the verification A21 of the super signature SS is positive. The use of the signature S and of the super signature SS allows further enhancing the security of the transactions insofar as this allows guaranteeing the authenticity of the terminal C2 with which the terminal C1 cooperates during the current transaction. The terminal C1 can thus trust the behavior of the terminal C2, and ensure that the terminal C2 is not likely to send it a transaction including valid second data DT2 (for example a new value of the first transaction identifier nonce2 and/or a new value of the generation counter GEN1a) to pay the amount of a credit already spent by said terminal C2 (i.e. in this example, from the user account U2).

According to other examples, the signature generation SS and its verification are according to the algorithm ECDSA or RSA PKCS #1 V1.5 or V2.1 (this is also valid for the signature S).

If the super signature SS is considered valid at A21, the terminal C1 carries out verification steps A24 and A25 (FIG. 8).

During the verification step A24, the terminal C1 verifies that the public key PK1a received at A20 in the data DT3 coincides with (is identical to) the public key PK1 of the terminal T1 stored in the memory area Z2 (and therefore coincides with the public key PK1 provided at A2 to the terminal C2 in this example).

During the verification step A25, the terminal C1 verifies that the amount MT1a of the credit CR as indicated by the terminal C2 in the data DT3 received at A20 coincides with (is identical to) the amount MT1 specified in the data DT1 transmitted at A2 by the terminal C1 to the terminal C2. According to one variant, the terminal C1 verifies at A25 that the amount MT1a is greater than the amount MT1 (for example in one case there are fees applied during the transaction TR1).

It should be noted that the order in which the verifications A21, A24 and A25 are performed can be adapted depending on the case. In general, the current transaction TR1 is approved by the terminal C1 only if the result of these verifications is positive.

Particularly, the terminal C1 approves the current transaction TR1 only if: the public key PK1a coincides with the public key PK1 and the amounts MT1a and MT1 coincide (or, in the aforementioned variant, only if the amount MT1a is greater than the amount MT1).

It should be noted that embodiments are also possible without carrying out at least any one (or neither) of steps A24 and A25. In this case, it is not necessary for the terminal C2 to provide the public key PK1a and/or the amount MT1a in the data DT2 sent at B12. Although this is possible, it is then also not necessary for the terminal C1 to send in the data DT1 at A2 its public key PK1 and/or the amount MT1.

Upon detection that the verification steps A21, A24 and A25 have passed successfully (positive results), the terminal C1 carries out steps A26-A42 (FIG. 8) as already described above with reference to FIGS. 5-6.

In this particular example, it is assumed that the terminal C1 detects at A26 that the initial value Vail of the generation counter GEN1 stored in the memory area Z2 on the one hand, and the value of the generation counter GEN1a received in the data DT3 on the other hand, are identical.

It is assumed that the terminal C1 then detects at A30 the presence in the history H1 of the input EN1 associated with the public key PK2 of the terminal C2 and with the transaction identifier nonce1. As already indicated, this pre-recorded identifier nonce1 can identify the most recent transaction (other than the current transaction TR1) during which a credit CR was received by the terminal C1 coming from the terminal C2. It is considered in this example that the identifiers nonce1 and nonce2 are transaction counters. As for the transaction counter nonce2, the pre-recorded counter nonce1 has for example been received by the terminal C1 from the terminal C2 during the last (the most recent) transaction to transfer a credit CR from the terminal C2 to the terminal C1. As already indicated, the use of these transaction identifiers allows preventing the double payments from the terminal C2 to the terminal C1 with the same credits CR.

The terminal C1 detects for example at A34 that the predetermined condition CD1 is fulfilled if the transaction counters nonce1 and nonce2 are different. Alternatively, the terminal C1 detects at A34 that the predetermined condition CD1 is fulfilled if the transaction counters nonce1 and nonce2 are such that nonce2>nonce1, in a particular case where the terminal C2 increments its identifier nonce to identify each new transaction to pay a credit CR.

It is now assumed that the terminal C1 detects at A34 (FIG. 8) that the transaction identifier nonce2 fulfills the predetermined condition CD1, which means that the current transaction TR1 is unique and that there is therefore no risk of double payment. The terminal C1 therefore approves the current transaction and proceeds to step A38 as previously described. In this example, the terminal C1 can use with confidence the transaction identifier nonce2 provided by the terminal C2 at A20 insofar as the authenticity of the terminal C2 has been verified beforehand using the signatures S and SS.

The terminal C1 therefore performs the storage A40 of a new input EN2 and the update A42 of the account balance ACN1, as already described previously with reference to FIGS. 5-6. It should be noted that during the storage step A40, the terminal C1 records in the history H1 a new input EN2 associated with the public key PK2 of the second terminal C2 and with the transaction identifier nonce2 received at A20 from the terminal C2. This transaction identifier nonce2 can thus be used by the terminal C1 during a next transaction during which the terminal C2 tries again to make a credit payment to the terminal C1. Particularly, the terminal C1 will be able to take into account this nonce2 during a new occurrence of step A34 to determine whether a new nonce (denoted nonce3) received satisfies the uniqueness condition CD1 (as already described with reference to step A34, FIGS. 5 and 8).

Furthermore, FIG. 9 represents one example of implementation of the management step A60 represented in FIG. 6. As already described, this step A60 aims at managing the memory space of the first memory area Z1, this step comprising a detection step A62 and an eviction process A74. This management step A60 can be triggered at various moments, in response to a triggering event detected at A62.

More specifically, it is assumed that the terminal C1 is in an initial state according to which:
- the account balance ACN1 stored in the memory area Z2 is equal to the amount ACN0 of at least one past transaction during which the terminal C1 received a credit CR from a debit device (ACN1=ACN0 where ACN0 is the amount of the past transaction(s);
- the generation counter GEN1 stored in the memory area Z2 is set to an initial value Val1 (GEN1=Val1);
- the history H1 stored in the memory area Z1 comprises history data DH0 representative of the past transaction(s).

Before the detection step A62, it is assumed that the terminal C1 processes (A59, FIG. 9) one or several offline transaction(s) TRX with at least any external terminal (for example with the terminal C2). Each time an offline transaction TRX is approved (A38, FIGS. 5 and 8), the terminal C1 updates its history H1 in the memory area Z1 and its account balance ACN1 in the memory area Z2. Once the offline transaction(s) TRX have been approved, the history H1 therefore comprises the history data DH0 as well as history data DH1 representative of the transactions TRX. The account balance ACN1 is also incremented by the amount ACNX of the performed offline transactions TRX (ACN1=ACN0+ACNX). It is assumed in this example that no eviction process A74 (FIG. 6) has been performed at this stage from the processing step A59, so that the generation counter GEN1 stored in the memory area Z2 remains unchanged at the initial value Vail.

It is now assumed that the terminal C1 verifies whether the predetermined condition CD2 is fulfilled and detects at A62 that the memory space ESP1 occupied in the first memory area Z1 satisfies this condition CD2, which means that there is a risk of saturation of the memory area Z1. This verification is for example performed during a transaction (at the end of the transaction for example). The terminal C1 detects for example that the occupied memory space ESP1 reaches at least one threshold value TH1 which can correspond, for example, to 75% or 80% of the total space of the memory area Z1.

As represented in FIG. 9, upon detection that the predetermined condition CD2 is satisfied (A62), the terminal C1 interrogates the online system NT1 in order to recover any data representative of online transactions TRY likely to have been recently received in order to pay credits CR to the account U1 associated with the terminal C1. To do so, the terminal C1 sends (A68) an online transaction request RQ1 to the online system NT1 which receives this request at C68 (FIG. 1). In response, the online system NT1 sends (C70) to the terminal C1 transaction data DHY—called online transaction data—representative of at least one online transaction TRY made by the online system NT1 in cooperation with at least one external device (other than C1) to pay a credit CR to the account U1 associated with the terminal C1.

The online transaction data DHY specifies particularly a credit CR balance ACNY to be paid to the account U1 associated with the terminal C1. These online transaction data DHY may also comprise a generation counter GENY associated with each offline transaction TRY.

The terminal C1 receives the online transaction data DHY at A70 and then processes (A72) these data DHY to update its account balance ACN1 and its history H1 accordingly. It is therefore assumed here that the terminal C1 credits the account balance ACN1 with the amount ACNY corresponding to the cumulative amounts of the online transactions TRY processed by the online system NT1 (thus ANC1=ACN0+ACNX+ACNY). Similarly, the terminal C1 can update the history H1 to include the online transaction data DHY of the online transactions TRY. It is assumed in this example that no eviction process A74 (FIG. 6) has been performed at this stage from the processing step A60, so that the generation counter GEN1 stored in the memory area Z2 remains unchanged at the initial value Vail.

It should be noted that if a generation counter GENY is provided by the online system NT1 in the online transaction data DHY for each online transaction TRY processed, then the terminal C1 can process at A72 these counters to verify whether they are valid. To do so, the terminal C1 verifies (A72) that each generation counter GENY received coincides with the current generation counter GEN1 stored in the memory area Z2, in the same way as during the verification step A26 previously described (FIGS. 5 and 8). The terminal C1 then only approves each transaction for which the generation counter GENY provided by the online system NT1 is valid (i.e. synchronous with the current generation counter GEN1). In other words, the terminal C1 then updates the account balance ACN1 stored in the second memory area Z2 from the online transaction data DHY corresponding to each online transaction TRY whose generation counter GENY provided at A70 coincides with the generation counter GEN1. The terminal C1 can also update the history H1 to include only the online transaction data DHY corresponding to each online transaction TRY whose associated generation counter GENY is valid.

According to one particular example, during the processing A72, the terminal C1 also verifies whether the online transaction data DHY received at A70 correspond to transaction data DH which are already stored in the history H1. In other words, the terminal C1 verifies that the online transactions TRY specified by the data DHY are not already present in the history H1. The terminal C1 then takes into account only the online transactions TRY that are not already stored in the history H1 to update the account balance ACN1 and the history H1 at A72.

Once the online transactions TRY have been processed, the terminal C1 performs the eviction process A74 in the same way as previously described with reference to FIGS. 5-6. In this example, the terminal C1 thus updates (A76) the generation counter GEN1 stored in its memory area Z2, so as to assign to this counter GEN1 a new value Val2, different from the initial value Val1. To do so, the terminal C1 for example increments the generation counter GEN1 by 1. The terminal C1 also carries out an eviction (or purge) A78 as already described so as to delete all or part of the history H1. It is assumed here that the entire history H1 is deleted so as to free as much memory space as possible.

According to one particular example, once the eviction process A74 has been performed, the terminal C1 sends (A90, FIG. 9) to the online system NT1 an update request RQ2 comprising the current generation counter GEN1, i.e. that has the new value Val2 assigned during the update A76, so that the online server NT1 can associate the public key PK1 of the first terminal C1 with the generation counter GEN1 set to the new value Val2 to allow its access to at least one external device (or to external devices) including, for example, the terminal C2.

Thus, in response to the request RQ2 received at B90, the online system NT1 updates (B92) a current value of the generation counter GENY stored in association with the public key PK1 of the terminal C1. This value can be stored and updated in a memory of said system NT1, for example in the memory of one or several servers SV (FIG. 1), so that the counter GENY is equal to the updated counter GEN1.

The generation counter GENY associated with the public key PK1 is also accessible by at least one external device, such as for example the terminal C2 in this particular case. Thus, the terminal C2 (and possibly also other external devices) is capable of processing subsequent transactions by using the generation counter GENY with the updated value, in order to pay a credit CR to the terminal C1. Particularly, the terminal C2 can thus include in its transaction data DT3 the up-to-date generation counter GENY (as a counter GEN1a) in the same way as described above with reference to the sending step A20 (FIGS. 5 and 8).

It should be noted that variants are possible in which step A64 of recovering the online transaction data DHY, and possibly also steps A90 and B90-B92, are not carried out.

As indicated above, the eviction process A74 described above with reference to FIGS. 6 and 9 can occur at various moments, depending on the configuration of the terminal C1 and the state of occupation of the memory area Z1. According to one particular example, the update A76 of the generation counter GEN1 is carried out after the sending A2 of the data DT1 but before the receipt A20 of the data DT1 (FIG. 7), causing the detection of a mismatch (desynchronization) of the generation counters GEN1 and GEN1a during the verification A26.

Those skilled in the art will understand that the embodiments and variants described above only constitute non-limiting examples of implementation of the disclosure. Particularly, those skilled in the art can envisage any adaptation or combination of the embodiments and variants described above, in accordance with the following claims, in order to meet a very specific need.

The invention claimed is:

1. A control method implemented by a first device able to process electronic transactions in cooperation with a second device, the first device comprising:
   a first memory area in which a history comprising one or several inputs representative of a transaction is stored, and
   a second memory area in which a first generation counter set to an initial value is stored,
   the method comprising, executing processor-implemented instructions for, during a processing of a current transaction:
   a) consulting the second memory area to determine the first generation counter at a current time during which the current transaction is processed;
   b) receiving, from the second device, first data comprising second data, the second data comprising:
      a public key of the second device,
      an amount of a credit to be paid during the current transaction,
      a second generation counter, and
      a first transaction identifier allocated by the second device to the current transaction;
   c) verifying that the first and second generation counters have values that are equal ("verification c");
   d) if the result of the verification c is negative, denying the current transaction by the first device;
   e) if the result of the verification c is positive, verifying in the first memory area that the history comprises an input associated with the public key of the second device ("verification e");
   f) if the result of the verification e is negative, approving the current transaction;
   g) if the result of the verification e is positive, verifying that the first transaction identifier satisfies a first predetermined condition indicating the uniqueness of the current transaction ("verification g");
   h) in response to determining that the result of the verification g is positive, approving the current transaction; wherein, if the current transaction is approved, the processing of the current transaction further comprises:
   i) storing in the history of a new input associated with the public key of the second device ("storage l"); and
   j) updating an account balance stored in the second memory area, so as to pay the amount of said credit to the account associated with the first device;
   the method further comprising a step of managing the first memory area, the management step being implemented before, after or during the current transaction and, comprising:
   k) detecting that the space occupied in the first memory area satisfies a second predetermined condition indicating a risk of saturation of said first memory area ("detection k"); and
   l) in response to the detection k, implementing an eviction process comprising:
      l1) Updating the first generation counter in the second memory area so as to assign to said first generation counter a new value different from the initial value ("update l1"); and
      l2) evicting at least part of the first memory area in order to free memory space ("eviction l2"),
      wherein when the management step is implemented during the current transaction, the management step is implemented with the exception of the following times:
      between and during the step of consulting the second memory area to determine the first generation counter at a current time during which the current transaction is processed and verification e, if the test of verification c is positive;
      between and during the step of consulting the second memory area to determine the first generation counter at a current time during which the current transaction is processed and verification c, if the test of verification c is negative; and
      between and during the step of consulting the second memory area to determine the first generation counter at a current time during which the current transaction is processed and the step of storage l.

2. The method of claim 1, wherein the processing of the current transaction comprises, before step b):
   m) sending to the second device of third data to request the payment by the second device of the amount of said credit to the account associated with the first device, said third data comprising the first generation counter set to the initial value.

3. The method of claim 1, wherein the first data comprises:
  a first signature calculated from the second data, and
  a second signature calculated from the second data and from the first signature;
  the method further comprising, after step b):
  n) verifying the second signature from the first signature and from the second data received in the first data and from a group public key associated with a group to which the first and second devices belong ("verification n"),
  wherein the current transaction is approved only if the result of the verification n is positive.

4. The method of claim 1, wherein if it is determined during the verification c that the first and second generation counters have values that are not equal, the current transaction is blocked.

5. The method of claim 1, wherein the first transaction identifier allocated by the second device is a counter representative of a current number of transactions made by the second device.

6. The method of claim 1, wherein during the storage i, the new input is associated with the public key of the second device and with the first transaction identifier;
  wherein the verification g comprises:
  determining a second transaction identifier stored, in association with the public key of the second device, in an input detected in the history during the verification e; and
  comparing the first transaction identifier with the second transaction identifier, wherein the first predetermined condition is detected to be satisfied if the first and second transaction identifiers are different or if the first and second transaction identifiers are counters such that the first transaction identifier is greater than the second transaction identifier.

7. The method of claim 1, wherein the method is implemented by a first virtual wallet implemented by the first device, in cooperation with a second virtual wallet implemented in the second device, the current transaction being a payment transaction of the credit in a cryptographic currency.

8. The method of claim 1, wherein the current transaction is a reputation transaction and the credit paid during the reputation transaction is a reputation credit.

9. The method of claim 1, wherein during the detection k, the second predetermined condition is satisfied if the space occupied in the memory area reaches a predetermined portion of the total space of the first memory area.

10. The method of claim 1, wherein during the eviction l2, the entire first memory area is emptied in order to free memory space.

11. The method of claim 1, wherein during the eviction process:
  the update l1 and the eviction l2 are carried out concomitantly, or
  the eviction l2 is carried out after the update l1.

12. The method of claim 1, wherein the update l1 of the first generation counter causes a blocking of all the transactions, processed by the first device, for which the second generation counter received has a value that differs from the new value.

13. The method of claim 1, wherein the step of managing the first memory area comprises, in response to the detection k and before the eviction process:
  o) Sending of an online transaction request to an online system comprising at least one server;
  p) receiving, in response to the online transaction request, online transaction data representative of at least one online transaction made by the online system in cooperation with at least one external device to pay a credit to the account associated with the first device, the online transaction data comprising a third generation counter in association with each online transaction;
  q) verifying for each online transaction that the first and third generation counters) have values that are equal; and
  r) updating, from the online transaction data corresponding to each online transaction whose third generation counter coincides with the first generation counter, of the account balance stored in the second memory area.

14. The method of claim 13, wherein the eviction process comprises, after the update l1:
  s) sending to the online system of the first generation counter having the new value assigned at update l1, so that the online server can associate the public key of the first device with the first generation counter set to the new value in order to allow its access to at least one external device to process subsequent transactions.

15. The method of claim 1 further comprising:
  t) acquiring, by the second device, of the public key of the second device, of the amount of the credit to be paid during the current transaction, of the second generation counter, and of the first transaction identifier allocated by the second device to the current transaction; and
  u) sending, by the second device to the first device, the first data comprising the second data, to cause the payment of the amount of the credit to the account associated with the first device.

16. A first device able to process electronic transactions in cooperation with a second device, the first device comprising:
  a first memory area in which a history comprising one or several inputs representative of a transaction is stored, and
  a second memory area in which a first generation counter set to an initial value is stored,
  the first device having a processor that, during processing of a current transaction:
  a) consults the second memory area to determine the first generation counter at a current time during which the current transaction is processed;
  b) receives, from the second device, first data comprising second data, the second data comprising:
  a public key of the second device,
  an amount of a credit to be paid during the current transaction,
  a second generation counter, and
  a first transaction identifier allocated by the second device to the current transaction;
  c) verifies that the first and second generation counters have values that are equal ("verification c");
  d) if the result of the verification c is negative, denies the current transaction by the first device;
  e) if the result of the verification c is positive, verifies in the first memory area that the history comprises an input associated with the public key of the second device ("verification e");
  f) if the result of the verification e is negative, approves the current transaction;
  g) if the result of the verification e is positive, verifies that the first transaction identifier satisfies a first predetermined condition indicating the uniqueness of the current transaction ("verification g");

h) in response to determining that the result of the verification g is positive, approves the current transaction; wherein, if the current transaction is approved, the processor further:
i) stores in the history of a new input associated with the public key of the second device ("storage i"); and
j) updates an account balance stored in the second memory area, so as to pay the amount of said credit to the account associated with the first device;

the processor further configured to manage the first memory area, the management being implemented before, after or during the current transaction and, comprising:
k) detects that the space occupied in the first memory area satisfies a second predetermined condition indicating a risk of saturation of said first memory area ("detection k"); and
l) in response to the detection k, implements an eviction process in which:
  l1) The first generation counter in the second memory area is updated so as to assign to said first generation counter a new value different from the initial value ("update l1"); and
  l2) At least part of the first memory area is evicted in order to free memory space ("eviction l2"), wherein when the management is implemented during the current transaction, the management is implemented with the exception of the following times:
  between and during when the second memory area is consulted to determine the first generation counter at a current time during which the current transaction is processed and verification e, if the test of verification C is positive;
  between and during when the second memory area is consulted to determine the first generation counter at a current time during which the current transaction is processed and verification c, if the test of verification c is negative; and
  between and during when the second memory area is consulted to determine the first generation counter at a current time during which the current transaction is processed and the step of storage l.

* * * * *